United States Patent
Guo et al.

(10) Patent No.: US 11,546,870 B2
(45) Date of Patent: Jan. 3, 2023

(54) METHOD AND APPARATUS FOR TRANSMITTING OR RECEIVING INFORMATION

(71) Applicant: Huawei Technologies Co., Ltd., Shenzhen (CN)

(72) Inventors: Zhiheng Guo, Beijing (CN); Xinqian Xie, Beijing (CN); Zukang Shen, Beijing (CN); Yi Long, Beijing (CN); Yang Zhao, Shanghai (CN); Lei Wan, Beijing (CN); David Jean-Marie Mazzarese, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/874,879

(22) Filed: May 15, 2020

(65) Prior Publication Data

US 2020/0280946 A1 Sep. 3, 2020

Related U.S. Application Data

(63) Continuation of application No. PCT/CN2018/116025, filed on Nov. 16, 2018.

(30) Foreign Application Priority Data

Nov. 17, 2017 (CN) .......................... 201711148388.X
Jan. 12, 2018 (CN) .......................... 201810032219.8

(51) Int. Cl.
*H04W 56/00* (2009.01)
*H04W 74/00* (2009.01)

(52) U.S. Cl.
CPC ..... *H04W 56/0045* (2013.01); *H04W 74/006* (2013.01)

(58) Field of Classification Search
None
See application file for complete search history.

(56) References Cited

U.S. PATENT DOCUMENTS 11,324,031 B2 * 5/2022 Li .................... H04W 72/1289
2012/0063425 A1 3/2012 Wang et al.
(Continued)

FOREIGN PATENT DOCUMENTS

CN 101888648 A 11/2010
CN 101998614 A 3/2011
(Continued)

OTHER PUBLICATIONS

3rd Generation Partnership Project; Technical Specification Group Radio Access Network; NR; Physical layer procedures for control (Release 15), 3GPP TS 38.213 V1.0.0 (Sep. 2017), 16 pages.
(Continued)

*Primary Examiner* — Mariela Vidal Carpio
(74) *Attorney, Agent, or Firm* — Slater Matsil, LLP

(57) ABSTRACT

A method and an apparatus for transmitting or receiving information are provided. The method includes: receiving, by a terminal device, indication information from a network device, where the indication information indicates a timing adjustment parameter, the timing adjustment parameter is to be used by the terminal device to determine transmit timings on a first uplink carrier and a second uplink carrier, the first uplink carrier is an uplink carrier of a first radio access technology, and the second uplink carrier is an uplink carrier of a second radio access technology; and determining, by the terminal device, the timing adjustment parameter based on the indication information.

14 Claims, 9 Drawing Sheets

(56) References Cited

U.S. PATENT DOCUMENTS

| | | | | |
|---|---|---|---|---|
| 2012/0120821 | A1* | 5/2012 | Kazmi | H04W 56/0045 370/336 |
| 2012/0250520 | A1* | 10/2012 | Chen | H04L 5/001 370/241 |
| 2013/0003682 | A1 | 1/2013 | Jiang et al. | |
| 2013/0028204 | A1* | 1/2013 | Dinan | H04W 72/0406 370/329 |
| 2013/0272229 | A1* | 10/2013 | Dinan | H04W 52/18 370/329 |
| 2013/0272232 | A1 | 10/2013 | Dinan | |
| 2013/0336295 | A1 | 12/2013 | Dinan | |
| 2014/0177602 | A1 | 6/2014 | Chen et al. | |
| 2016/0219547 | A1* | 7/2016 | Seo | H04L 5/14 |
| 2016/0316440 | A1 | 10/2016 | Dinan | |
| 2017/0265227 | A1* | 9/2017 | Wang | H04W 76/11 |
| 2019/0053316 | A1* | 2/2019 | Aiba | H04W 56/0045 |
| 2019/0141697 | A1* | 5/2019 | Islam | H04W 72/0453 |
| 2019/0174516 | A1* | 6/2019 | Shimezawa | H04W 72/1263 |
| 2019/0215870 | A1* | 7/2019 | Babaei | H04L 5/001 |
| 2019/0268869 | A1* | 8/2019 | Akkarakaran | H04W 72/0446 |
| 2020/0267668 | A1* | 8/2020 | Xu | H04W 52/04 |
| 2021/0160126 | A1* | 5/2021 | Cirik | H04L 5/0048 |
| 2021/0168858 | A1* | 6/2021 | Liu | H04L 5/0012 |
| 2021/0185614 | A1* | 6/2021 | Zhou | H04W 76/27 |

FOREIGN PATENT DOCUMENTS

| | | |
|---|---|---|
| CN | 102196479 A | 9/2011 |
| CN | 102340797 A | 2/2012 |
| CN | 102892192 A | 1/2013 |
| CN | 102905361 A | 1/2013 |
| CN | 102932902 A | 2/2013 |
| CN | 105580457 A | 5/2016 |
| CN | 109729578 A | 5/2019 |
| EP | 3704908 A1 | 9/2020 |
| JP | 2013516917 A | 5/2013 |
| JP | 2014510457 A | 4/2014 |
| JP | 2016531531 A | 10/2016 |
| JP | 2017017728 A | 1/2017 |
| WO | 2011085200 A1 | 7/2011 |
| WO | 2014018333 A2 | 1/2014 |
| WO | 2016017717 A1 | 2/2016 |
| WO | 2017012337 A1 | 1/2017 |
| WO | 2017132212 A1 | 8/2017 |
| WO | 2019089964 A1 | 5/2019 |

OTHER PUBLICATIONS

3rd Generation Partnership Project; Technical Specification Group Radio Access Network; NR; Medium Access Control (MAC) protocol specification (Release 15), 3GPP TS 38.321 V1.1.0 (Nov. 2017), 64 pages.

3rd Generation Partnership Project; Technical Specification Group Radio Access Network; NR; Physical channels and modulation (Release 15), 3GPP TS 38.211 V0.1.2 (Aug. 2017), 29 pages.

3rd Generation Partnership Project; Technical Specification Group Radio Access Network; NR; Multiplexing and channel coding (Release 15), 3GPP TS 38.212 V0.1.1 (Sep. 2017), 28 pages.

3GPP TSG RAN WG4 Meeting #54, R4-100457, "LS on multiple timing advance for inter-band CA," San Francisco, CA, USA, Feb. 22-26, 2010, 2 pages.

3rd Generation Partnership Project; Technical Specification Group Radio Access Network; NR; User Equipment (UE) radio transmission and reception; Part 1: Range 1 Standalone (Release 15), 3GPP TS 38.101-1 V0.2.0 (Oct. 2017), 35 pages.

3rd Generation Partnership Project; Technical Specification Group Radio Access Network; New Radio(NR); Requirements for support of radio resource management (Release 15), 3GPP TS 38.133 V0.3.0 (Nov. 2017), 25 pages.

Xiaomi, "SUL impact on TA", 3GPP TSG-RAN2 #100, R2-1712376, Reno, Nevada, US, Nov. 27-Dec. 1, 2017, 3 pages.

Nokia et al., "On remaining aspects of NR CA/DC", 3GPP TSG-RAN WG1 Meeting NR#90bis, R1-1718608, Prague, CZ, Oct. 9-13, 2017, 7 pages.

ZTE et al., "Discussion on SUL carrier", 3GPP TSG RAN WG1 Meeting #99bis, R2-1711841, Prague, Czech, Oct. 9-13, 2017, 6 pages.

CMCC, "Discussion on design of Msg2 for SUL", 3GPP TSG RAN WG1 Meeting 90bis, R1-1717891, Prague, CZ, Oct. 9-13, 2017, 2 pages.

LG Electronics, "Discussion on carrier aggregation for NR", 3GPP TSG RAN WG1 Meeting 90bis, R1-1717973, Oct. 9-13, 2017, 9 Pages, Prague, CZ.

* cited by examiner

METHOD AND APPARATUS FOR TRANSMITTING OR RECEIVING INFORMATION

CROSS-REFERENCE TO RELATED APPLICATIONS

This application is a continuation of International Application No. PCT/CN2018/116025, filed on Nov. 16, 2018, which claims priority to Chinese Patent Application No. 201711148388.X, filed on Nov. 17, 2017 and Chinese Patent Application No. 201810032219.8, filed on Jan. 12, 2018. All of the aforementioned patent applications are hereby incorporated by reference in their entireties.

TECHNICAL FIELD

This application relates to the field of wireless communications technologies, and in particular, to a method and an apparatus for transmitting or receiving information.

BACKGROUND

In a wireless communications system, communication may be classified into different types based on different types of transmitting nodes and receiving nodes. Generally, information transmission from a network device to a terminal device is referred to as downlink communication, and information transmission from the terminal device to the network device is referred to as uplink communication. In a long term evolution (LTE) or long term evolution advanced (LTE-A) communications system, different duplex modes are mainly classified into a frequency division duplex (FDD) mode and a time division duplex (TDD) mode.

For a wireless communications system working in the TDD mode, a downlink carrier and an uplink carrier are carriers of a same carrier frequency. In a new radio (new RAT, NR) technology of a 5th generation (5G) mobile communications system, an uplink-downlink decoupling technology may be applied. To be specific, in addition to a TDD carrier that may be used to perform uplink or downlink communication, an additional uplink carrier may be used to perform uplink communication, where the additional uplink carrier is generally referred to as a supplementary uplink (SUL) carrier. To be specific, an NR terminal device may simultaneously have two uplink carriers to perform uplink communication.

Currently, for a terminal device in an LTE-NR dual connectivity (DC) mode, if an NR TDD carrier and a SUL carrier are both deployed in NR system, at least three uplink carriers are configured for the terminal device, including an LTE uplink carrier, an NR TDD carrier, and an NR SUL carrier. Timings for transmitting uplink signals on the three uplink carriers by the terminal device need to be equal, to maximally ensure uplink spectral efficiency of the terminal device; otherwise, a waste of uplink resources is caused. When timings for transmitting uplink signals on the three uplink carriers by the terminal device are unequal, in some time segments, the terminal device cannot transmit an uplink signal, causing a waste of uplink resources.

SUMMARY

This application provides a method and an apparatus for transmitting or receiving information, to avoid a waste of uplink resources caused by unequal transmit timings of a terminal device on a plurality of uplink carriers.

According to a first aspect, this application provides a method for transmitting information, where the method includes: receiving, by a terminal device, indication information from a network device, where the indication information indicates a timing adjustment parameter, the timing adjustment parameter is to be used by the terminal device to determine transmit timings on a first uplink carrier and a second uplink carrier, the first uplink carrier is an uplink carrier of a first radio access technology, and the second uplink carrier is an uplink carrier of a second radio access technology; and determining, by the terminal device, the timing adjustment parameter based on the indication information.

The terminal device determines transmit timings on a plurality of uplink carriers based on one timing adjustment parameter transmitted by the network device. Therefore, it is ensured that the terminal device maintains a same transmit timing on the plurality of uplink carriers, uplink resources can be effectively used, and a waste of uplink resources is avoided.

In a possible design, the second uplink carrier includes at least two second uplink carriers, and the at least two second uplink carriers belong to a same cell; and the timing adjustment parameter is to be used by the terminal device to determine transmit timings on the first uplink carrier and the at least two second uplink carriers.

The terminal device determines, based on the indication information transmitted by the network device in one message, transmit timings corresponding to a plurality of uplink carriers of a same radio access technology in a same cell, so that uplink resources can be effectively used.

In a possible design, the at least two second uplink carriers include at least one TDD carrier and at least one SUL carrier.

In a possible design, the first uplink carrier is a carrier in a primary cell, and the second uplink carrier is a carrier in a secondary cell; and the receiving, by the terminal device, the indication information from the network device includes: receiving, by the terminal device, the indication information on a first downlink carrier from the network device, where the first downlink carrier and the first uplink carrier belong to a same cell, or the first downlink carrier and the first uplink carrier belong to a same radio access technology.

The terminal device receives, by using the downlink carrier in the primary cell, the indication information transmitted by the network device. Therefore, transmit timings on a plurality of uplink carriers that belong to a same radio access technology can be determined based on one piece of indication information.

In a possible design, the first radio access technology is LTE, and the second radio access technology is NR.

In a possible design, the first uplink carrier is an uplink carrier in the primary cell, and the second uplink carrier is an uplink carrier in the secondary cell; and the method further includes: receiving, by the terminal device, a downlink reference signal on a first downlink carrier from the network device, where the first downlink carrier and the first uplink carrier belong to a same cell; and determining, by the terminal device based on the downlink reference signal, power for transmitting an uplink signal on the second uplink carrier to the network device.

The terminal device receives, by using the downlink carrier in the primary cell, the downlink reference signal transmitted by the network device. Therefore, the power for transmitting the uplink signal on the uplink carrier in the secondary cell to the network device can be determined based on the downlink reference signal of the primary cell, and a case in which the terminal device cannot determine, based on a downlink reference signal of the secondary cell, power for transmitting an uplink signal on the uplink carrier in the secondary cell to the network device is avoided.

In a possible design, the method further includes: receiving, by the terminal device, a downlink reference signal on a first downlink carrier from the network device, where the first downlink carrier is a downlink carrier of the first radio access technology, and the first downlink carrier and the first uplink carrier belong to a same cell; and determining, by the terminal device based on the downlink reference signal, power for transmitting an uplink signal on the second uplink carrier to the network device.

The terminal device receives, by using the downlink carrier of the first radio access technology, the downlink reference signal transmitted by the network device. Therefore, the power for transmitting the uplink signal on the uplink carrier of the second first radio access technology can be determined based on the downlink reference signal of the first radio access technology, and a case in which the terminal device cannot determine, based on a downlink reference signal of the second radio access technology, power for transmitting an uplink signal on the uplink carrier of the second radio access technology to the network device is avoided.

In a possible design, the method further includes: receiving, by the terminal device, a downlink reference signal on a first downlink carrier from the network device, where the first downlink carrier is a downlink carrier of the first radio access technology, and the first downlink carrier and the first uplink carrier belong to different cells; and determining, by the terminal device based on the downlink reference signal, power for transmitting an uplink signal on the second uplink carrier to the network device.

According to a second aspect, this application provides a method for transmitting information, where the method includes: determining, by a network device, indication information, where the indication information indicates a timing adjustment parameter, the timing adjustment parameter is to be used by a terminal device to determine transmit timings on a first uplink carrier and a second uplink carrier, the first uplink carrier is an uplink carrier of a first radio access technology, and the second uplink carrier is an uplink carrier of a second radio access technology; and transmitting, by the network device, the indication information to the terminal device.

In a possible design, the second uplink carrier includes at least two second uplink carriers, and the at least two second uplink carriers belong to a same cell; and the timing adjustment parameter is to be used by the terminal device to determine transmit timings on the first uplink carrier and the at least two second uplink carriers.

In a possible design, the at least two second uplink carriers include at least one TDD carrier and at least one SUL carrier.

In a possible design, the first uplink carrier is a carrier in a primary cell, and the second uplink carrier is a carrier in a secondary cell; and the transmitting, by the network device, the indication information to the terminal device includes: transmitting, by the network device, the indication information on a first downlink carrier to the terminal device, where the first downlink carrier and the first uplink carrier belong to a same cell, or the first downlink carrier and the first uplink carrier belong to a same radio access technology.

In a possible design, the first radio access technology is LTE, and the second radio access technology is NR.

In a possible design, the first uplink carrier is an uplink carrier in the primary cell, and the second uplink carrier is an uplink carrier in the secondary cell; and the method further includes: transmitting, by the network device, a downlink reference signal on a first downlink carrier to the terminal device, where the first downlink carrier and the first uplink carrier belong to a same cell.

In a possible design, the method further includes: transmitting, by the network device, a downlink reference signal on a first downlink carrier to the terminal device, where the first downlink carrier is a downlink carrier of the first radio access technology, and the first downlink carrier and the first uplink carrier belong to a same cell.

In a possible design, the method further includes: transmitting, by the network device, a downlink reference signal on a first downlink carrier to the terminal device, where the first downlink carrier is a downlink carrier of the first radio access technology, and the first downlink carrier and the first uplink carrier belong to different cells.

According to a third aspect, this application provides a method for transmitting information, where the method includes: determining, by a network device, a downlink reference signal, where the downlink reference signal is used by a terminal device to determine power for transmitting an uplink signal on a first uplink carrier to the network device; and transmitting, by the network device, the downlink reference signal on a first downlink carrier to the terminal device, where the first downlink carrier and the first uplink carrier belong to different cells.

In a possible design, the first downlink carrier is a downlink carrier in a primary cell, and the first uplink carrier is an uplink carrier in a secondary cell.

In a possible design, the first downlink carrier is a downlink carrier of a first radio access technology, and the first uplink carrier is an uplink carrier of a second radio access technology.

In a possible design, the first radio access technology is LTE, and the second radio access technology is NR.

In a possible design, the first uplink carrier, a second uplink carrier, and a second downlink carrier belong to a same cell.

In a possible design, the network device transmits indication information to the terminal device, where the indication information indicates the terminal device to determine, based on the downlink reference signal, the power for transmitting the uplink signal on the first uplink carrier to the network device, or the indication information indicates the terminal device not to determine, based on the downlink reference signal, the power for transmitting the uplink signal on the first uplink carrier to the network device.

In a possible design, the network device transmits second indication information to the terminal device, where the second indication information is used by the terminal device to determine the downlink reference signal.

In a possible design, the second indication information includes at least one of resource information, sequence information, and power information corresponding to the downlink reference signal.

According to a fourth aspect, this application provides a method for receiving information, where the method includes: receiving, by a terminal device, a downlink reference signal on a first downlink carrier from a network device, where the downlink reference signal is used by the terminal device to determine power for transmitting an uplink signal on a first uplink carrier to the network device; and determining, by the terminal device based on the downlink reference signal, the power for transmitting the uplink signal on the first uplink carrier to the network device.

In a possible design, the first downlink carrier and the first uplink carrier belong to different cells.

In a possible design, the first downlink carrier is a downlink carrier in a primary cell, and the first uplink carrier is an uplink carrier in a secondary cell.

In a possible design, the first downlink carrier is a downlink carrier of a first radio access technology, and the first uplink carrier is an uplink carrier of a second radio access technology.

In a possible design, the first radio access technology is LTE, and the second radio access technology is NR.

In a possible design, the first uplink carrier, a second uplink carrier, and a second downlink carrier belong to a same cell.

In a possible design, the terminal device receives first indication information from the network device, where the first indication information indicates the terminal device to determine, based on the downlink reference signal, the power for transmitting the uplink signal on the first uplink carrier to the network device, or the first indication information indicates the terminal device not to determine, based on the downlink reference signal, the power for transmitting the uplink signal on the first uplink carrier to the network device.

In a possible design, the terminal device receives second indication information from the network device, where the second indication information is used by the terminal device to determine the downlink reference signal.

In a possible design, the second indication information includes at least one of resource information, sequence information, or power information corresponding to the downlink reference signal.

According to a fifth aspect, this application provides a method for receiving information, where the method includes: receiving, by a terminal device, indication information transmitted by a network device, where the indication information includes a timing adjustment parameter, and the timing adjustment parameter is to be used by the terminal device to determine transmit timings on a first uplink carrier and a second uplink carrier; and determining, by the terminal device, the timing adjustment parameter based on the indication information.

In a possible design, the first uplink carrier and the second uplink carrier are uplink carriers in a same cell.

In a possible design, the first uplink carrier is a TDD carrier, and the second uplink carrier is a SUL carrier; and the timing adjustment parameter is to be used by the terminal device to determine transmit timings on the TDD carrier and the SUL carrier.

In a possible design, a first timing for transmitting a random access signal on the first uplink carrier to the network device by the terminal device is equal to a second timing for transmitting a random access signal on the second uplink carrier to the network device by the terminal device.

In a possible design, a first timing offset between a first timing for transmitting a random access signal on the first uplink carrier to the network device by the terminal device and a third timing for receiving a downlink signal on a first downlink carrier from the network device is equal to a second timing offset between a second timing for transmitting a random access signal on the second uplink carrier to the network device by the terminal device and the third timing for receiving the downlink signal on the first downlink carrier from the network device, where the first downlink carrier and the first uplink carrier are TDD carriers, and the first downlink carrier and the first uplink carrier are associated.

In a possible design, a first timing for transmitting a random access signal on the first uplink carrier to the network device by the terminal device is unequal to a second timing for transmitting a random access signal on the second uplink carrier to the network device by the terminal device.

In a possible design, a first timing offset between a first timing for transmitting a random access signal on the first uplink carrier to the network device by the terminal device and a third timing for receiving a downlink signal on a first downlink carrier from the network device is unequal to a second timing offset between a second timing for transmitting a random access signal on the second uplink carrier to the network device by the terminal device and the third timing for receiving the downlink signal on the first downlink carrier from the network device, where the first downlink carrier and the first uplink carrier are TDD carriers, and the first downlink carrier and the first uplink carrier are associated.

In a possible design, the first offset is greater than 0, and the second offset is equal to 0.

According to a sixth aspect, this application provides a method for transmitting information, where the method includes: determining, by a network device, indication information, where the indication information includes a timing adjustment parameter, and the timing adjustment parameter is to be used by a terminal device to determine transmit timings on a first uplink carrier and a second uplink carrier; and transmitting, by the network device, the indication information to the terminal device.

In a possible design, the first uplink carrier and the second uplink carrier are uplink carriers in a same cell.

In a possible design, the first uplink carrier is a TDD carrier, and the second uplink carrier is a SUL carrier; and the timing adjustment parameter is to be used to indicate the terminal device to determine transmit timings on the TDD carrier and the SUL carrier.

According to a seventh aspect, this application provides a method for transmitting information, where the method includes: determining, by a terminal device, power information corresponding to a target uplink carrier, where the target uplink carrier is one of a first uplink carrier or a second uplink carrier; and transmitting, by the terminal device, the power information and indication information to a network device, where the indication information indicates the target uplink carrier.

In a possible design, the power information includes a difference between first power and second power, where the first power includes maximum transmit power of the terminal device, and the second power includes uplink signal transmit power estimated by the terminal device.

In a possible design, the first uplink carrier and the second uplink carrier belong to a same cell.

In a possible design, the terminal device adds the power information and the indication information to a same message and transmits the message to the network device.

In a possible design, the indication information includes one bit; and when the bit is 0, the indication information indicates the first uplink carrier, or when the bit is 1, the indication information indicates the second uplink carrier.

In a possible design, the indication information is implicitly included in the power information.

According to an eighth aspect, this application provides a method for receiving information, where the method includes: receiving, by a network device, power information and indication information from a terminal device, where the indication information indicates a target uplink carrier, and the target uplink carrier is one of a first uplink carrier or a second uplink carrier; and determining, by the network device based on the indication information, the target uplink carrier corresponding to the power information.

In a possible design, the power information includes a difference between first power and second power, where the first power includes maximum transmit power of the terminal device, and the second power includes uplink signal transmit power estimated by the terminal device.

In a possible design, the first power includes maximum transmit power that is of the terminal device and that corresponds to the target uplink carrier, and the second power includes signal transmit power that is on the target uplink carrier and that is estimated by the terminal device.

In a possible design, the first uplink carrier and the second uplink carrier belong to a same cell.

In a possible design, the network device receives the power information and the indication information in a same message from the terminal device.

In a possible design, the indication information includes one bit; and when the bit is 0, the indication information indicates the first uplink carrier, or when the bit is 1, the indication information indicates the second uplink carrier.

In a possible design, the indication information is implicitly included in the power information.

According to a ninth aspect, this application provides a method for transmitting information, where the method includes: determining, by a network device, power control information corresponding to a first terminal device and indication information corresponding to the first terminal device, where the power control information is used by the first terminal device to determine uplink transmit power, the indication information indicates a target uplink carrier, and the target uplink carrier is one of a first uplink carrier or a second uplink carrier; and adding, by the network device, the power control information and the indication information to a piece of downlink control information, and transmitting the downlink control information to the first terminal device.

In a possible design, the downlink control information further includes power control information corresponding to a second terminal device, and the network device transmits the downlink control information to the second terminal device.

According to a tenth aspect, this application provides a method for receiving information, where the method includes: receiving, by a terminal device, power control information and indication information from a network device, where the power control information is used by the terminal device to determine transmit power on a target uplink carrier, the target uplink carrier is one of a first uplink carrier or a second uplink carrier, and the indication information indicates the target uplink carrier; and determining, by the terminal device based on the indication information, the target uplink carrier corresponding to the power control information.

According to an eleventh aspect, an embodiment of this application provides an apparatus for receiving information, where the apparatus may be a terminal device, or may be a chip in a terminal device. The apparatus has a function for implementing each embodiment of the first aspect, the fourth aspect, the fifth aspect, the seventh aspect, and the tenth aspect. The function may be implemented by hardware, or may be implemented by corresponding software executed by hardware. The hardware or software includes one or more modules corresponding to the foregoing function.

In a possible design, when the apparatus is a terminal device, the terminal device includes a processing unit and a communications unit, where the processing unit may be, for example, a processor, the communications unit may be, for example, a transceiver, and the transceiver includes a radio frequency circuit. Optionally, the terminal device further includes a storage unit, where the storage unit may be, for example, a memory. When the terminal device includes a storage unit, the storage unit stores a computer-executable instruction, where the processing unit is connected to the storage unit, and the processing unit executes the computer-executable instruction stored in the storage unit, so that the terminal device performs the method for receiving information according to any one of the first aspect, the fourth aspect, the fifth aspect, the seventh aspect, and the tenth aspect.

In another possible design, when the apparatus is a chip in a terminal device, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the method for receiving information according to any one of the first aspect, the fourth aspect, the fifth aspect, the seventh aspect, and the tenth aspect can be performed. Optionally, the storage unit is a storage unit in the chip, for example, a register or a cache; or the storage unit may be a storage unit located outside the chip in the terminal device, for example, a read-only memory or another type of static storage device capable of storing static information and instructions, or a random access memory.

According to a twelfth aspect, this application provides an apparatus for transmitting information, where the apparatus may be a network device, or may be a chip in a network device. The apparatus has a function for implementing each embodiment of the second aspect, the third aspect, the sixth aspect, the eighth aspect, and the ninth aspect. The function may be implemented by hardware, or may be implemented by corresponding software executed by hardware. The hardware or software includes one or more modules corresponding to the foregoing function.

In a possible design, when the apparatus is a network device, the network device includes a processing unit and a communications unit, where the processing unit may be, for example, a processor, and the communications unit may be, for example, a transceiver, where the transceiver includes a radio frequency circuit. Optionally, the network device further includes a storage unit, where the storage unit may be, for example, a memory. When the network device includes a storage unit, the storage unit stores a computer-executable instruction, where the processing unit is connected to the storage unit, and the processing unit executes the computer-executable instruction stored in the storage unit, so that the network device performs the method for transmitting information according to any one of the second aspect, the third aspect, the sixth aspect, the eighth aspect, and the ninth aspect.

In another possible design, when the apparatus is a chip in a network device, the chip includes a processing unit and a communications unit, where the processing unit may be, for example, a processor, and the communications unit may be, for example, an input/output interface, a pin, or a circuit. The processing unit may execute a computer-executable instruction stored in a storage unit, so that the method for transmitting information according to any one of the second aspect, the third aspect, the sixth aspect, the eighth aspect, and the ninth aspect can be performed. Optionally, the storage unit is a storage unit in the chip, for example, a register or a cache; or the storage unit may be a storage unit located outside the chip in the network device, for example, a read-only memory (ROM) or another type of static storage device capable of storing static information and an instructions, or a random access memory (RAM).

Any one of the foregoing processors may be a general purpose central processing unit (central processing unit, CPU), a microprocessor, an application-specific integrated circuit (ASIC), or one or more integrated circuits configured to control procedure execution of the methods for receiving information in the first aspect, the fourth aspect, the fifth aspect, the seventh aspect, and the tenth aspect.

Any one of the foregoing processors may be a general purpose central processing unit, a microprocessor, an application-specific integrated circuit, or one or more integrated circuits configured to control procedure execution of the methods for transmitting information in the second aspect, the third aspect, the sixth aspect, the eighth aspect, and the ninth aspect.

According to a thirteenth aspect, an embodiment of this application further provides a computer-readable storage medium, where the computer-readable storage medium stores an instruction, and when the instruction is run on a computer, the computer is enabled to perform the method in each of the foregoing aspects.

According to a fourteenth aspect, an embodiment of this application further provides a computer program product including an instruction, where when the instruction is run on a computer, the computer is enabled to perform the method in each of the foregoing aspects.

DETAILED DESCRIPTION OF ILLUSTRATIVE EMBODIMENTS

Figure 1:
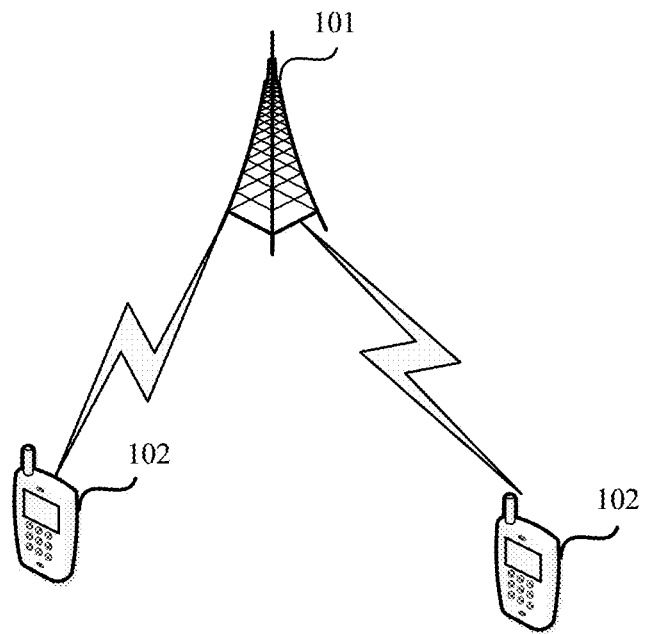
FIG. 1 is a schematic structural diagram of a communications network system according to this application.

This application provides a method for transmitting and receiving information, where the method may be applied to a communications network system. FIG. 1 is a structural diagram of a possible communications network system according to an embodiment of this application. As shown in FIG. 1, the communications network system includes a network device 101 and a plurality of terminal devices 102. The network device 101 may communicate with the plurality of terminal devices 102 by using an air interface protocol.

The network device 101 mentioned in this application is a device that connects a terminal to a wireless network. The network device includes but is not limited to an evolved NodeB (eNB), a radio network controller (RNC), a NodeB (NB), a base station controller (BSC), a base transceiver station (BTS), a home NodeB (for example, a home evolved nodeB, or a home node B, HNB), a baseband unit (BBU), a gNodeB (gNB), a transmission and receiving point (TRP), a transmission point (TP), and a mobile switching center. In addition, the network device may further include a Wi-Fi access point (AP) or the like.

The terminal device 102 mentioned in this application may be a device having radio transmitting and receiving functions. The terminal device may be deployed on land, for example indoor, outdoor, hand-held, wearable, or vehicle-mounted; or may be deployed on water (for example, on a ship); or may be deployed in the air (for example, on a plane, a balloon, and a satellite). The terminal device may be a mobile phone (mobile phone), an Internet of Things (IoT) terminal device, a tablet computer (Pad), a computer having radio transmitting and receiving functions, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in this embodiment of this application. Sometimes, the terminal device may also be referred to as user equipment (UE), an access terminal device, a subscriber unit, a subscriber station, a mobile station, a remote station, a remote terminal device, a mobile device, a user terminal device, a terminal device, a wireless communications device, a user agent, a user apparatus, or the like. In other words, any device that can perform data communication with the network device may be used as a terminal device in this application. For ease of description, UE may be used for description.

In this application, the system architecture shown in FIG. 1 is mainly used as an example for description, but this application is not limited thereto. For example, this application may also be applicable to a system architecture in which a macro base station and a micro base station perform communication. This is not specifically limited.

Communications systems to which the system architecture is applicable include but are not limited to: a long term evolution time division duplex (TDD LTE) system, a long term evolution frequency division duplex (FDD LTE) system, a long term evolution-advanced (LTE-A) system, and various wireless communications systems evolved in the future (for example, a new radio (new RAT, NR) system).

Using the NR system as an example, the terminal device may transmit an uplink signal to the network device by using a supplementary uplink (SUL) carrier. The SUL carrier is a carrier on which only an uplink resource is used for transmission in a current radio access technology. For example, in the NR system, a carrier A is used only for NR uplink transmission, and the carrier is not used for downlink transmission, or the carrier A may be used for uplink transmission in an LTE communications system but is not used for NR downlink transmission. In this case, the carrier A is a SUL carrier.

Figure 2A:
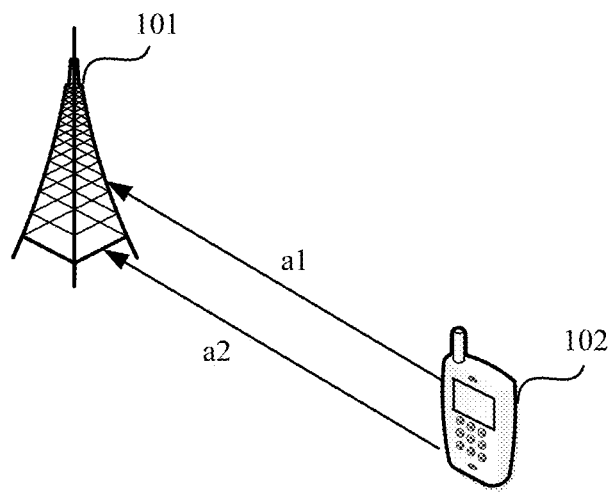
FIG. 2a to FIG. 2d are respectively schematic diagrams of application scenarios of methods for transmitting and receiving information according to this application.

In a possible scenario, referring to FIG. 2a, a network device 101 is an NR network device. Two uplink carriers used by a terminal device 102 to transmit signals to the network device 101, that is, a TDD carrier (a carrier b1) and a SUL carrier (a carrier b2), are deployed for the network device 101. Both the two carriers may be used for uplink communication between the terminal device and the network device. In this case, the TDD carrier and the SUL carrier belong to a same cell.

Figure 2B:
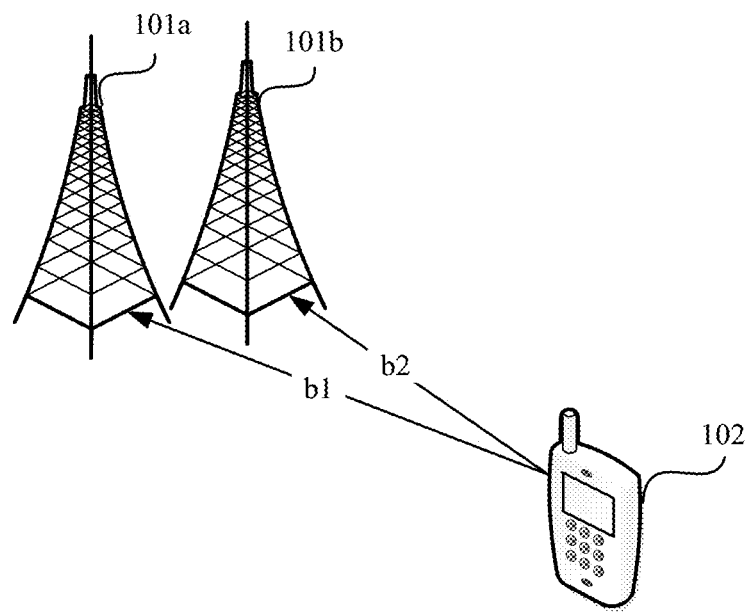

In another possible scenario, referring to FIG. 2b, a network device 101a and a network device 101b are network devices of two different radio access technologies, and the network device 101a and the network device 101b are co-sited. A terminal device 102 may access the two network devices simultaneously. An uplink carrier (b1) is deployed for the network device 101, and an uplink carrier (b2) is deployed for the network device 101b. For example, an NR network device and an LTE network device are co-sited. The terminal device 102 may access the NR network device and the LTE network device simultaneously. The terminal device 102 transmits an uplink signal to the NR network device by using an NR uplink carrier, and transmits an uplink signal to the LTE network device by using an LTE uplink carrier. A possible implementation is that the terminal device accesses the NR network device in a time division duplex mode, and accesses the LTE network device in a frequency division duplex mode. It should be noted that, the terminal device may access the NR network device and the LTE network device in a dual connectivity DC mode, or may access the NR network device and the LTE network device in a carrier aggregation CA mode. A major difference between DC and CA in the prior art is that when a terminal device uses the DC mode, each of a plurality of carriers accessed by the terminal device has an independent media access control MAC layer protocol stack, but when the terminal device uses the CA mode, a plurality of carriers of the terminal device share a unique MAC layer protocol stack. With evolution of wireless communications technologies, definitions and differences of DC and CA may be the same as or different from those in the prior art.

Figure 2C:
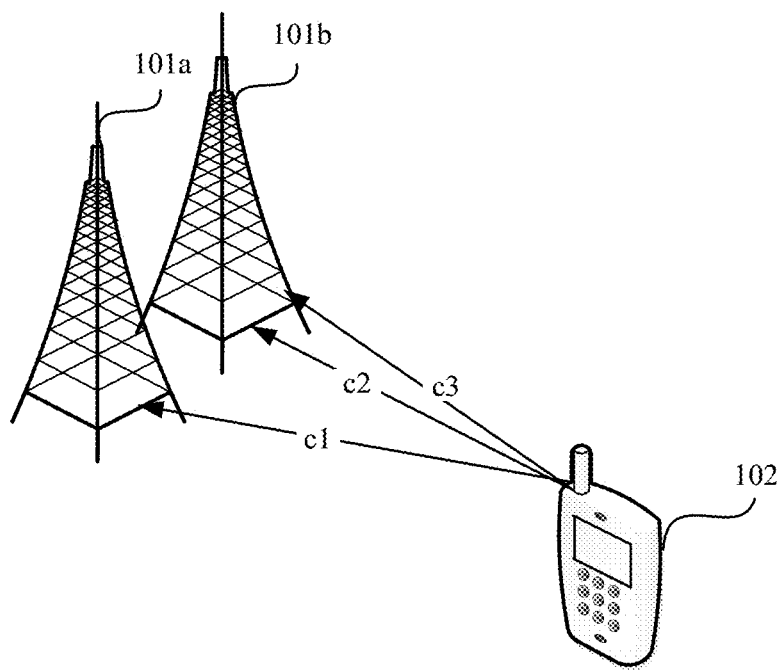

In another possible scenario, referring to FIG. 2c, a network device 101a and a network device 101b are network devices of two different radio access technologies, and the network device 101a and the network device 101b are co-sited. A terminal device 102 may access the two network devices simultaneously. One uplink carrier is deployed for the network device 101a, and two uplink carriers are deployed for the network device 101b. For example, the network device 101a may be an LTE network device, and the network device 101b may be an NR network device. An LTE UL carrier (c1) is deployed for the LTE network device, and a TDD carrier (c2) and a SUL carrier (c3) are deployed for the NR network device. It should be noted that, in this scenario, the NR SUL carrier and the LTE UL carrier may be uplink carriers of a same frequency. To be specific, the NR SUL carrier and the LTE UL carrier share the same frequency. For example, frequencies of an NR UL carrier and an NR DL carrier are 3.5 GHz, a frequency of an LTE UL carrier is 1.75 GHz, a frequency of an LTE DL carrier is 1.85 GHz, and a frequency of an NR SUL carrier is 1.75 GHz. Certainly, the NR SUL carrier and the LTE UL carrier may alternatively be uplink carriers of different frequencies. For example, the frequency of the NR SUL carrier is 700 MHz, and the frequency of the LTE UL carrier is 1.8 GHz.

Figure 2D:
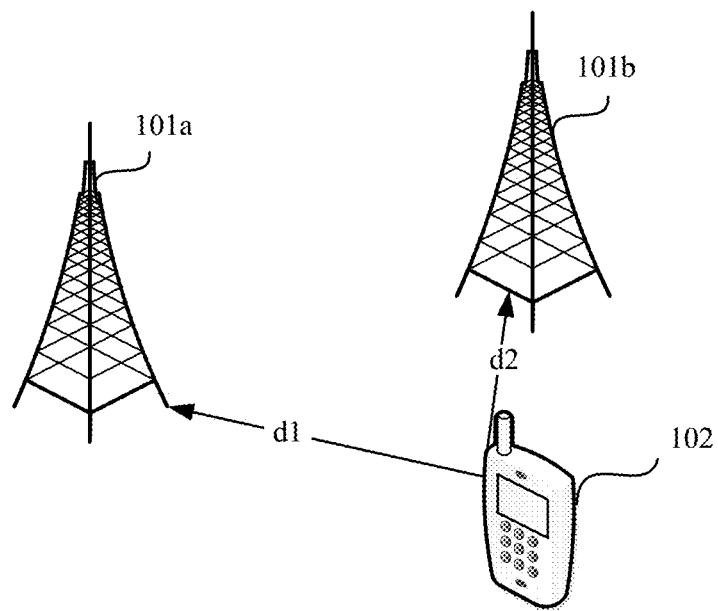

In another possible scenario, referring to FIG. 2d, a network device 101a and a network device 101b are network devices of different radio access technologies, and the network device 101a and the network device 101b are not co-sited. Specifically, the network device 101a may be an LTE network device, and the network device 101b may be an NR network device. The LTE network device and the NR network device are two network devices in different physical positions, and the NR network device is deployed an NR UL carrier (d2) and an NR SUL carrier (d1) used for uplink transmission, but an LTE uplink carrier and the NR SUL carrier are co-located, and the NR UL carrier and the NR SUL carrier or LTE are not co-located. It should be noted that, in this scenario, the NR SUL carrier and the LTE UL carrier may be uplink carriers of a same frequency. To be specific, the NR SUL carrier and the LTE UL carrier the same frequency. For example, frequencies of an NR UL carrier and an NR DL carrier are 3.5 GHz, a frequency of an LTE UL carrier is 1.75 GHz, a frequency of an LTE DL carrier is 1.85 GHz, and a frequency of an NR SUL carrier is 1.75 GHz. Certainly, the NR SUL carrier and the LTE UL carrier may alternatively be uplink carriers of different frequencies. For example, the frequency of the NR SUL carrier is 700 MHz, and the frequency of the LTE UL carrier is 1.75 GHz.

A timing in this application may be understood as a start moment (or an end moment) for transmitting a signal by a transmitting device, or a start moment (or an end moment) for receiving a signal by a receiving device. For ease of description, the following uses a radio frame as an example. Certainly, a time unit of another type such as a slot or a symbol may also be used.

The timing used for signal transmission may be generally understood as an absolute moment. When a terminal device transmits an uplink signal, the terminal device needs to determine, based on a received synchronization signal, a start moment of a radio frame used for downlink reception, where the start moment of the radio frame used for downlink reception may serve as a reference point, and the terminal device further determines, based on the start moment of the radio frame, a start moment of a radio frame used for uplink transmission. In this case, the start moment of the radio frame used for uplink transmission may be considered as a timing, and the timing is an absolute moment. Then the terminal device transmits the uplink signal based on the timing.

It should be understood that, the timing may be understood as a plurality of time points. In other words, one timing may include a plurality of time points (a plurality of moments). If the plurality of moments include at least three moments, the at least three moments are arranged at equal intervals. For example, assuming that the start moment of the radio frame used by the terminal device for downlink reception is used as a reference moment and denoted as 0 milliseconds (ms), and that duration of one radio frame is denoted as 10 ms, the timing of the radio frame used by the terminal device for downlink reception may include a plurality of moments such as 0 ms, 10 ms, 20 ms, . . . . To be specific, the terminal device may receive a downlink signal at some or all of the plurality of time points such as 0 ms, 10 ms, 20 ms, . . . . The start moment of the radio frame used by the terminal device for uplink transmission is advanced by x ms relatively to the start moment of the radio frame used for downlink reception, and the timing used by the terminal device for uplink transmission may include a plurality of moments such as (0-x) ms, (10-x) ms, (20-x) ms, . . . . Certainly, the plurality of moments may alternatively be arranged at unequal intervals. This is not limited herein.

Figure 3:
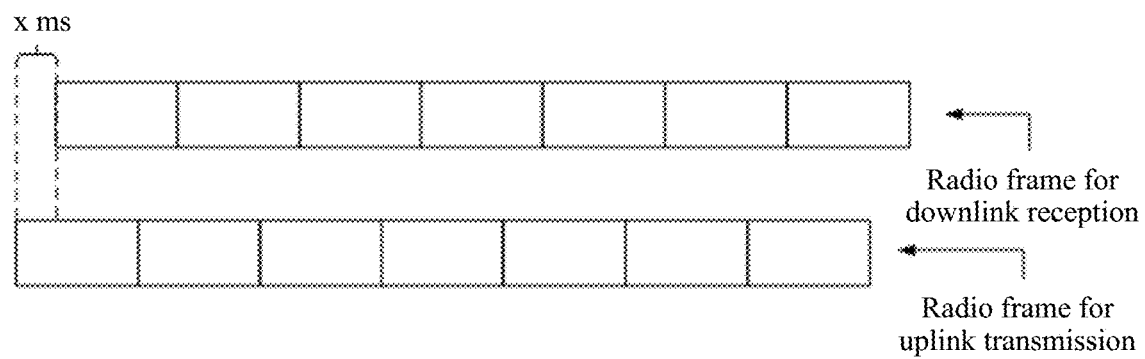
FIG. 3 is a schematic diagram of a radio frame used for downlink reception and a radio frame used for uplink transmission according to this application.

A timing advance may be understood from a perspective of a relative moment. Each timing specified in a communication protocol is a relative moment. Generally, a time reference point is defined in the communication protocol, and a specific offset usually exists between the timing in the communication protocol and the time reference point. FIG. 3 is a schematic diagram of a radio frame used for downlink reception and a radio frame used for uplink transmission. In the protocol, a start moment of a radio frame used for downlink reception is generally used as a time reference point. As shown in FIG. 3, it is specified that a start moment of a radio frame used by a terminal device for uplink transmission is advanced by x ms relatively to a start moment of a radio frame used for downlink reception, and the x ms may be considered as a timing advance. Numbers of the two radio frames may be the same.

In the prior art, a network device transmits timing adjustment indication information to a terminal device, where the timing adjustment indication information carries a timing adjustment parameter, and the timing adjustment parameter is a TA value. For example, the TA value may be equal to 10. In this case, the terminal device should understand that an uplink transmit timing of the terminal device is advanced by 10×Ts seconds relatively to a downlink receive timing, where Ts is a timing adjustment granularity.

Figure 4:
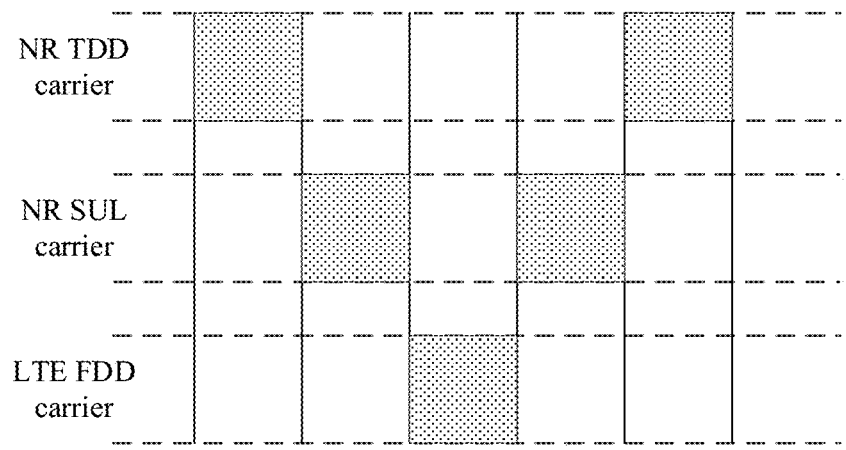
FIG. 4 is a schematic diagram of a scenario in which transmit timings are aligned according to this application.

The NR system supports a terminal in working in an LTE-NR dual connectivity (dual connectivity, DC) mode. To be specific, the terminal may work in the LTE system and the NR system simultaneously. Referring to the scenario shown in FIG. 2c, a TDD carrier and a SUL carrier may be deployed for the NR network device, while an FDD carrier may be deployed for the LTE network device. For the terminal device in LTE-NR DC mode, at least three uplink carriers are configured for the terminal device, including an LTE uplink carrier, an NR TDD carrier, and an NR SUL carrier. Timings for transmitting uplink signals by the terminal device on the three uplink carriers need to be equal, to maximally ensure uplink spectral efficiency of the terminal device; otherwise, a waste of uplink resources is caused. As shown in a scenario in which timings are aligned in FIG. 4, when the terminal device transmits an uplink signal by switching between different uplink carriers, a signal is transmitted at each uplink time.

Figure 5:
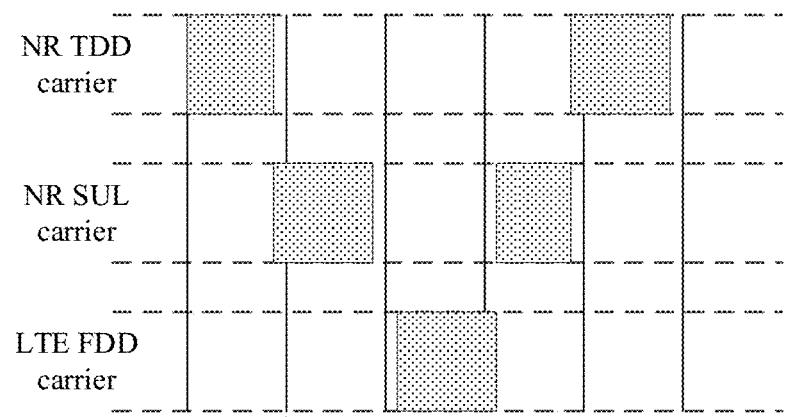
FIG. 5 is a schematic diagram of a scenario in which transmit timings are not aligned according to this application.

Currently, because an LTE timing adjustment parameter and an NR timing adjustment parameter are transmitted separately, a case in which timings of the terminal device on different uplink carriers are unequal occurs. When the timings for transmitting uplink signals by the terminal device on the three uplink carriers are unequal, in some time segments, as shown in FIG. 5, the terminal device cannot transmit an uplink signal, causing a waste of uplink resources.

Figure 6:
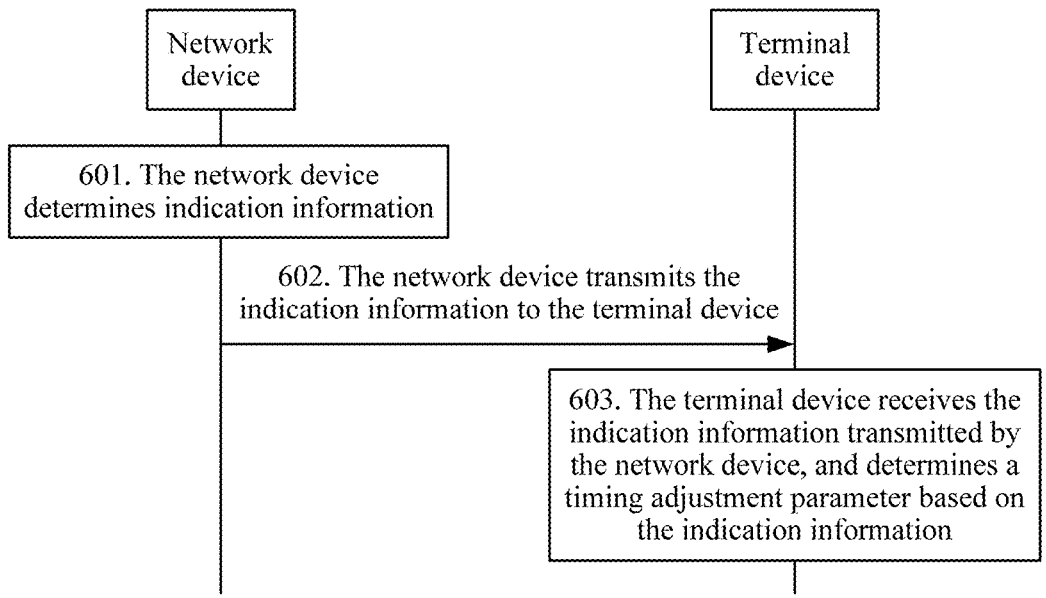
FIG. 6 is a schematic flowchart of a method for transmitting and receiving information according to this application.

To resolve the technical problem, for example, FIG. 6 shows a process of transmitting and receiving information according to this application. The following uses a manner of interaction between a network device and a terminal device to describe the process of transmitting and receiving information.

As shown in FIG. 6, the process includes the following steps.

Step 601: The network device determines indication information.

In this application, the indication information indicates a timing adjustment parameter. The timing adjustment parameter is to be used by the terminal device to determine transmit timings on a first uplink carrier and a second uplink carrier, the first uplink carrier is an uplink carrier of a first radio access technology, and the second uplink carrier is an uplink carrier of a second radio access technology.

It should be noted that, the first radio access technology may be LTE, and the second radio access technology may be NR. Correspondingly, the network device may be an LTE network device, or may be an NR network device. It should be understood that, an LTE network device and an NR network device may be deployed on a same site. In this case, although the LTE network device and the NR network device are a same network device physically, it may be understood that there are two network devices logically: one LTE network device, and one NR network device, or it may be understood that there are two serving cells: one LTE cell and one NR cell. It should be understood that, the LTE cell and the NR cell belong to a same timing adjustment group.

Because an NR uplink carrier may further include a SUL carrier, the second uplink carrier may include at least two uplink carriers, where the at least two uplink carriers belong to a same cell. In this case, the timing adjustment parameter is to be used by the terminal device to determine transmit timings on the first uplink carrier and the at least two second uplink carriers. Certainly, when the second uplink carrier is an NR uplink carrier, the at least two second uplink carriers may include at least one TDD carrier and at least one SUL carrier, where the TDD carrier may also be referred to as an NR UL carrier, or may be directly referred to as a UL carrier, or certainly may have another name. This is not limited herein. For example, when there are three second uplink carriers, the second uplink carriers may be a combination of two TDD carriers and one SUL carrier, or may be a combination of one TDD carrier and two SUL carriers. In this case, correspondingly, the timing adjustment parameter is to be used by the terminal device to determine transmit timings on the first uplink carrier, at least one TDD carrier, and at least one SUL carrier. It should be understood that, the first uplink carrier, the at least one TDD carrier, and the at least one SUL carrier belong to a same timing adjustment group.

Step 602: The network device transmits the indication information to the terminal device.

There are two serving cells within coverage of the network device, where one is an LTE cell, and the other is an NR cell, and the indication information may be transmitted by the LTE cell to the terminal device, or may be transmitted by the NR cell to the terminal device. By transmitting indication information of one timing adjustment parameter, the network device may indicate, to the terminal device, a timing adjustment parameter used for determining a plurality of uplink carriers, to ensure that the terminal device can maintain a same transmit timing on the plurality of uplink carriers.

It should be noted that, the first uplink carrier may be a carrier in a primary cell, and the second uplink carrier may be a carrier in a secondary cell. In other words, the first uplink carrier may be an LTE carrier, the second uplink carrier may be an NR carrier, the LTE cell is a primary cell, and the NR cell is a secondary cell. The network device may transmit the indication information on a first downlink carrier to the terminal device, and the terminal device may receive the indication information on the first downlink carrier from the network device. The first downlink carrier and the first uplink carrier may belong to a same cell. For example, the first downlink carrier and the first uplink carrier belong to a same LTE cell.

Step 603: The terminal device receives the indication information from the network device, and determines a timing adjustment parameter based on the indication information.

After receiving the indication information, the terminal device may determine the timing adjustment parameter based on the indication information. In this case, the terminal device can determine the transmit timings on the first uplink carrier and the second uplink carrier based on the timing adjustment parameter. Specifically, when the network device uses a same timing adjustment parameter to indicate the terminal device to perform timing adjustment on the LTE UL carrier and the NR UL carrier, the terminal device determines transmit timings on the LTE UL carrier and the NR UL carrier based on the timing adjustment parameter. When the network device uses a same timing adjustment parameter to indicate the terminal device to perform timing adjustment on the LTE UL carrier, the NR UL carrier, and the NR SUL carrier, the terminal device determines transmit timings on the LTE UL carrier, the NR UL carrier, and the NR SUL carrier based on the timing adjustment parameter. When the network device uses a same timing adjustment parameter to indicate the terminal device to perform timing adjustment on the LTE UL carrier and the NR SUL carrier, the terminal device determines transmit timings on the LTE UL carrier and the NR SUL carrier based on the timing adjustment parameter.

It should be noted that, the timing adjustment parameter transmitted by the network device to the terminal device may be a positive number or 0, or may be a negative number. Specifically, when the timing adjustment parameter transmitted by the network device to the terminal device is a negative number, the terminal device determines that an uplink transmit timing of the terminal device is later than a downlink receive timing. For example, if a value of a timing adjustment parameter TA is −20, the terminal device determines that the uplink transmit timing is later than the downlink receive timing by 20×Ts, where Ts is a timing adjustment granularity. For another example, if a value of a timing adjustment parameter TA is 10, the terminal device determines that the uplink transmit timing is earlier than the downlink receive timing by 10×Ts. For another example, if a value of a timing adjustment parameter TA is 0, the terminal device determines that the uplink transmit timing remains unchanged relatively to the downlink receive timing. This embodiment of this application is only an example, and this is not limited.

This application further provides a process of transmitting and receiving information, where the process may be applied to the scenario shown in FIG. 2a.

Figure 7:
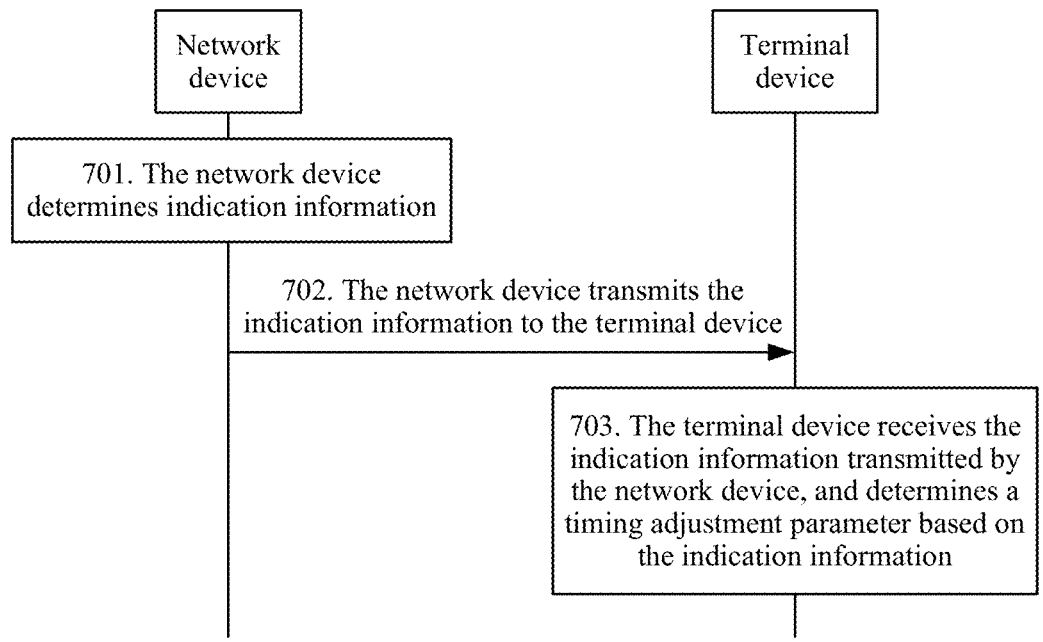
FIG. 7 is a schematic flowchart of a method for transmitting and receiving information according to this application.

As shown in FIG. 7, the process includes the following steps.

Step 701: A network device determines indication information.

The indication information includes a timing adjustment parameter, and the timing adjustment parameter is to be used by a terminal device to determine transmit timings on a first uplink carrier and a second uplink carrier. The first uplink carrier and the second uplink carrier are uplink carriers in a same cell. For example, the first uplink carrier and the second uplink carrier are two NR uplink carriers, the first uplink carrier is a TDD carrier, and the second uplink carrier is a SUL carrier. The timing adjustment parameter is to be used by the terminal device to determine transmit timings on the TDD carrier and the SUL carrier.

Step 702: The network device transmits the indication information to a terminal device.

Step 703: The terminal device receives the indication information transmitted by the network device, and determines a timing adjustment parameter based on the indication information.

After receiving the indication information transmitted by the network device, the terminal device may determine the timing adjustment parameter based on the indication information. Correspondingly, a first subcarrier spacing for performing uplink transmission by the terminal device on the NR TDD carrier may be the same as or different from a second subcarrier spacing for performing uplink transmission on the NR SUL carrier by the terminal device.

When the first subcarrier spacing is different from the second subcarrier spacing, a timing adjustment granularity corresponding to the timing adjustment parameter is related to the subcarrier spacing for performing uplink transmission by the terminal device. For example, a timing adjustment granularity T1 corresponding to a 15 KHz subcarrier spacing is 0.25 Ts, and a timing adjustment granularity T2 corresponding to a 30 KHz subcarrier spacing is 0.5 Ts. To be specific, timing adjustment granularities corresponding to different subcarrier spacings are different. Therefore, when the timing adjustment parameter transmitted by the network device to the terminal device is TA, the terminal device needs to determine a timing adjustment granularity corresponding to the timing adjustment parameter TA.

In a possible manner, the terminal device determines that the timing adjustment granularity is a timing adjustment granularity corresponding to a larger one of the first subcarrier spacing and the second subcarrier spacing. For example, if the timing adjustment granularity T1 corresponding to the 15 KHz subcarrier spacing is 0.25 Ts, and the timing adjustment granularity T2 corresponding to the 30 KHz subcarrier spacing is 0.5 Ts, the terminal device may determine that the timing adjustment granularity is 0.5 Ts. If the timing adjustment granularity T1 corresponding to the 15 KHz subcarrier spacing is Ts, and the timing adjustment granularity T2 corresponding to the 30 KHz subcarrier spacing is 0.5 Ts, the terminal device may determine that the timing adjustment granularity is Ts.

In another possible manner, the terminal device determines that the timing adjustment granularity is a timing adjustment granularity corresponding to a smaller one of the first subcarrier spacing and the second subcarrier spacing. For example, if the timing adjustment granularity T1 corresponding to the 15 KHz subcarrier spacing is 0.25 Ts, and the timing adjustment granularity T2 corresponding to the 30 KHz subcarrier spacing is 0.5 Ts, the terminal device may determine that the timing adjustment granularity is 0.25 Ts. If the timing adjustment granularity T1 corresponding to the 15 KHz subcarrier spacing is Ts, and the timing adjustment granularity T2 corresponding to the 30 KHz subcarrier spacing is 0.5 Ts, the terminal device may determine that the timing adjustment granularity is 0.5 Ts.

In still another possible manner, the terminal device determines that the timing adjustment granularity is a timing adjustment granularity corresponding to the first subcarrier spacing of the NR UL carrier. For example, if the timing adjustment granularity corresponding to the first subcarrier spacing of the NR UL carrier is 0.4 Ts, the terminal device determines that the timing adjustment granularity is 0.4 Ts.

In still another possible manner, the network device adds indication information indicating a timing adjustment granularity to a message carrying the timing adjustment parameter, and the terminal device determines the corresponding timing adjustment granularity based on the indication information. For example, the network device may use an explicit indication manner, that is, the indication information directly indicates a timing adjustment granularity value or index. For example, the indication information may be 1-bit information, where a state 0 indicates an adjustment granularity value Ts, and a state 1 indicates an adjustment granularity value 0.5 Ts, and details may be shown in Table 1. Alternatively, the network device may use an implicit indication manner, that is, the indication information may indicate an index of an uplink carrier or a value or an index of a subcarrier spacing. In this case, the terminal device first determines the corresponding uplink carrier or subcarrier spacing based on the indication information, and then determines a corresponding timing adjustment granularity value based on the uplink carrier or subcarrier spacing. This embodiment of this application is only an example, and this is not limited.

TABLE 1

| Indication information | State 0 | State 1 |
| --- | --- | --- |
| Timing adjustment granularity | Ts | 0.5 Ts |

Before the terminal device receives the indication information transmitted by the network device, the terminal device needs to transmit a random access signal to the network device, so that the network device determines the timing adjustment parameter. The terminal device may transmit the random access signal on the first uplink carrier to the network device, or may transmit the random access signal on the second uplink carrier to the network device, where the random access signal may be a random access preamble.

Optionally, a first timing offset exists between a first timing for transmitting the random access signal on the first uplink carrier to the network device by the terminal device and a receive timing for receiving a downlink signal on a first downlink carrier from the network device by the terminal device, and a first timing offset also exists between a second timing for transmitting the random access signal on the second uplink carrier to the network device by the terminal device and the receive timing for receiving the downlink signal on the first downlink carrier from the network device by the terminal device. For example, the first timing offset may be a parameter predetermined in a protocol. For example, the first timing offset may be $N_{TAoffset}$ in LTE or NR. To be specific, a value of $N_{TAoffset}$ used when the terminal device transmits the random access signal on the first uplink carrier and a value of $N_{TAoffset}$ used when the terminal device transmits the random access signal on the second uplink carrier are equal or may be understood as that the same $N_{TAoffset}$ is used. For another example, the first timing offset may be transmitted by the network device to the terminal device. Specifically, the first timing offset may be a first value or a second value. In this case, the network device transmits, to the terminal device, indication information used to indicate that the first timing offset is the first value or the second value. The first uplink carrier may be a TDD carrier, the second uplink carrier may be a SUL carrier, and the first downlink carrier may be a TDD carrier associated with the first uplink carrier. It should be understood that, the first downlink carrier and the second uplink carrier are respectively a uplink carrier and a downlink carrier of a TDD carrier. The first timing for transmitting the random access signal on the first uplink carrier to the network device by the terminal device is equal to the second timing for transmitting the random access signal on the second uplink carrier to the network device. Therefore, the terminal device needs to determine only one timing or one timing offset for the first uplink carrier and the second uplink carrier. This is simpler than determining two different timings or two different timing offsets for the first uplink carrier and the second uplink carrier, and can reduce complexity of the terminal device.

In the foregoing embodiment, the first uplink carrier and the second uplink carrier belong to a same first timing adjustment group. A third uplink carrier and a fourth uplink carrier may be further configured for the terminal device, and the third uplink carrier and the fourth uplink carrier belong to a second timing adjustment group different from the first timing adjustment group. In this case, the network device may transmit two pieces of indication information to the terminal device, where one piece of indication information indicates the first timing offset of the terminal device in the first timing adjustment group, and the other piece of indication information indicates a second timing offset of the terminal device in the second timing adjustment group. To be specific, the terminal device receives first indication information from the network device, where the first indication information indicates the first timing offset, of the terminal device, corresponding to the first timing adjustment group. Optionally, the terminal device further receives second indication information from the network device, where the second indication information indicates the second timing offset, of the terminal device, corresponding to the second timing adjustment group, and the first timing offset and the second timing offset may be the same or may be different. To be specific, for different timing adjustment groups, the network device may configure a timing offset separately for each timing adjustment group, where timing offsets corresponding to different timing adjustment groups may be the same or may be different. Using the timing offset $N_{TAoffset}$ as an example, for different timing adjustment groups, the network device may configure $N_{TAoffset}$ separately for each timing adjustment group for the terminal device, where $N_{TAoffset}$ corresponding to different timing adjustment groups may be the same or may be different. Optionally, uplink carriers in a same timing adjustment group may belong to a same frequency band, or may belong to different frequency bands. For example, the first uplink carrier in the first timing adjustment group belongs to a first frequency band, and the second uplink carrier in the first timing adjustment group belongs to a second frequency band. Optionally, the first frequency band is a frequency band below 6 GHz, and the second frequency band is a frequency band above 6 GHz. It should be noted that, the method is not limited to that in the foregoing embodiment, and certainly may be applied to another scenario. A quantity of uplink carriers in a timing adjustment group is not limited to two, and may be one or three or even more. In addition, a quantity of timing adjustments to which a plurality of uplink carriers of a terminal device can belong is not limited to only one or two either, and certainly may be three or more.

Optionally, a first timing offset exists between a first timing for transmitting the random access signal on the first uplink carrier to the network device by the terminal device and a receive timing for receiving a downlink signal on a first downlink carrier from the network device by the terminal device, and a second timing offset also exists between a second timing for transmitting the random access signal on the second uplink carrier to the network device by the terminal device and the receive timing for receiving the downlink signal on the first downlink carrier from the network device by the terminal device, where the first timing offset and the second timing offset are unequal. Specifically, the first/second timing offset may be a parameter predetermined in a protocol. For example, the first timing offset may be $N_{TAoffset}$ in LTE or NR. To be specific, a value of $N_{TAoffset1}$ used when the terminal device transmits the random access signal on the first uplink carrier is unequal to a value of $N_{TAoffset2}$ used when the terminal device transmits the random access signal on the second uplink carrier. The first uplink carrier may be a TDD carrier, the second uplink carrier may be a SUL carrier, and the first downlink carrier may be a TDD carrier associated with the first uplink carrier. Preferably, $N_{TAoffset2}$ may be equal to 0, and $N_{TAoffset1}$ is greater than 0. This helps enhance, when a SUL carrier is shared by LTE and NR, performance of receiving a random access signal by the network device from a terminal device, and can avoid interference between random access signals transmitted by an LTE terminal device and an NR terminal device.

Optionally, a first timing offset exists between a first timing for transmitting the random access signal on the first uplink carrier to the network device by the terminal device and a receive timing for receiving a downlink signal on a first downlink carrier from the network device by the terminal device, and a second timing offset also exists between a second timing for transmitting the random access signal on the second uplink carrier to the network device by the terminal device and the receive timing for receiving the downlink signal on the first downlink carrier from the network device by the terminal device, where the first timing offset and the second timing offset may be equal or may be unequal. Specifically, the first/second timing offset may be a parameter predetermined in a protocol. For example, the first timing offset may be $N_{TAoffset}$ in LTE or NR. For example, at least two values are predefined in the protocol, for example, a first value and a second value. In this case, the terminal device determines that the first timing offset is equal to the first value. The terminal device receives, from the network device, indication information used to indicate that the second timing offset is the first value or the second value, and determines, based on the indication information, that the second timing offset is equal to the first value or the second value. For another example, at least two values are predefined in the protocol, for example, a first value and a second value. In this case, the terminal device determines that the first timing offset is equal to the first value, and the terminal device determines, according to a predefined rule, that the second offset is equal to the first value or the second value. The first uplink carrier may be a TDD carrier, the second uplink carrier may be a SUL carrier, and the first downlink carrier may be a TDD carrier associated with the first uplink carrier. Preferably, the second value may be equal to 0, and the first value is greater than 0. The timing offset for transmitting the random access signal by the terminal device is notified by using the indication information, and therefore the transmit timing of the terminal device can be flexibly adjusted.

It should be noted that, the foregoing method for determining a timing and a timing offset for transmitting a random access signal by the terminal device is not limited to that in this embodiment of this application, and may also be applied to another case, and certainly may also be used as an independent method. This is not limited herein.

Optionally, with reference to the scenario shown in FIG. 2b, in this application, the first subcarrier spacing for performing uplink transmission on the NR UL carrier by the terminal device may be the same as or different from the second subcarrier spacing for performing uplink transmission on the LTE UL carrier by the terminal device. When the first subcarrier spacing is different from the second subcarrier spacing, and the timing adjustment parameter transmitted by the network device to the terminal device is TA, the terminal device needs to determine the timing adjustment granularity corresponding to the timing adjustment parameter TA. The terminal device determines that the timing adjustment granularity is a timing adjustment granularity corresponding to a larger one of the first subcarrier spacing and the second subcarrier spacing. For example, if the timing adjustment granularity T1 corresponding to the 15 KHz subcarrier spacing is 0.25 Ts, and the timing adjustment granularity T2 corresponding to the 30 KHz subcarrier spacing is 0.5 Ts, the terminal device may determine that the timing adjustment granularity is 0.5 Ts. If the timing adjustment granularity T1 corresponding to the 15 KHz subcarrier spacing is Ts, and the timing adjustment granularity T2 corresponding to the 30 KHz subcarrier spacing is 0.5 Ts, the terminal device may determine that the timing adjustment granularity is Ts.

In another possible manner, the terminal device determines that the timing adjustment granularity is a timing adjustment granularity corresponding to a smaller one of the first subcarrier spacing and the second subcarrier spacing. For example, if the timing adjustment granularity T1 corresponding to the 15 KHz subcarrier spacing is 0.25 Ts, and the timing adjustment granularity T2 corresponding to the 30 KHz subcarrier spacing is 0.5 Ts, the terminal device may determine that the timing adjustment granularity is 0.25 Ts. If the timing adjustment granularity T1 corresponding to the 15 KHz subcarrier spacing is Ts, and the timing adjustment granularity T2 corresponding to the 30 KHz subcarrier spacing is 0.5 Ts, the terminal device may determine that the timing adjustment granularity is 0.5 Ts.

In still another possible manner, the terminal device determines that the timing adjustment granularity is a timing adjustment granularity corresponding to the first subcarrier spacing of the NR UL carrier. For example, if the timing adjustment granularity corresponding to the first subcarrier spacing of the NR UL carrier is 0.4 Ts, the terminal device determines that the timing adjustment granularity is 0.4 Ts.

In still another possible manner, the network device adds indication information indicating a timing adjustment granularity to a message carrying the timing adjustment parameter, and the terminal device determines the corresponding timing adjustment granularity based on the indication information. For example, the network device may use an explicit indication manner, that is, the indication information directly indicates a timing adjustment granularity value or index. For example, the indication information may be 1-bit information, where a state 0 indicates an adjustment granularity value Ts, and a state 1 indicates an adjustment granularity value 0.5 Ts, and details may be shown in Table 1. Alternatively, the network device may use an implicit indication manner, that is, the indication information may indicate an index of an uplink or a value or an index of a subcarrier spacing. Therefore, the terminal device first determines the corresponding uplink carrier or subcarrier spacing based on the indication information, and then determines a corresponding timing adjustment granularity value based on the uplink carrier or subcarrier spacing.

In a different implementation, when the terminal device accesses LTE and NR in a CA mode, an LTE cell is a primary cell, and an NR cell is a secondary cell. In this case, the terminal device receives the timing adjustment parameter in the primary cell, and the terminal device may determine that the timing adjustment granularity is a timing adjustment granularity corresponding to the primary cell. It should be noted that, the implementation in this example is not limited to access of the terminal device to network devices of two different radio access technologies in the CA mode, and is also applied to access of the terminal device to a plurality of network devices of a same radio access technology in the CA mode. Certainly, the terminal device may also perform access in a DC mode. This is not limited herein.

Figure 8:
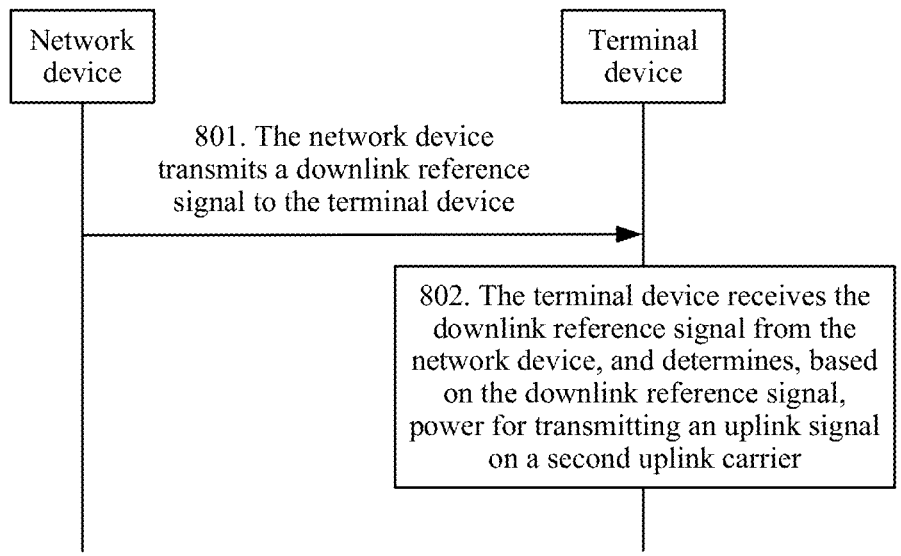
FIG. 8 is a schematic flowchart of a power control method according to this application.

In this application, the terminal device may perform measurement based on a downlink reference signal transmitted on an NR DL carrier by the network device, to obtain a measurement result, and then perform power control during uplink transmission based on the measurement result (including a path loss). To be specific, the terminal device may adjust, based on the path loss, power of the terminal device for transmitting a signal on an NR UL carrier. However, the path loss is not applicable to power control performed when the terminal device performs uplink transmission on the NR SUL carrier. To enable the terminal device to perform power control during uplink transmission on the NR SUL carrier, this application proposes a method for power control during uplink transmission. As shown in FIG. 8, the process specifically includes the following steps:

Step 801: A network device transmits a downlink reference signal to a terminal device.

In this application, the first uplink carrier may be a carrier in a primary cell, and the second uplink carrier may be a carrier in a secondary cell. In other words, the first uplink carrier may be an LTE carrier, the second uplink carrier may be an NR carrier, an LTE cell is a primary cell, and an NR cell is a secondary cell.

In this case, the network device may transmit the downlink reference signal on a first downlink carrier to the terminal device, where the first downlink carrier and the first uplink carrier may belong to a same cell. For example, the first downlink carrier and the first uplink carrier belong to a same LTE cell, the first downlink carrier is an LTE downlink carrier, and the first uplink carrier is an LTE uplink carrier. Optionally, the first downlink carrier and the first uplink carrier may alternatively belong to different cells. For example, the first downlink carrier is an LTE downlink carrier, and the first uplink carrier may be an NR uplink carrier.

Step 802: The terminal device receives the downlink reference signal from the network device, and determines, based on the downlink reference signal, power for transmitting an uplink signal on a second uplink carrier.

The terminal device may receive the downlink reference signal from the first downlink carrier, where the first downlink carrier is an LTE downlink carrier. The terminal device may determine, based on the downlink reference signal received on the LTE downlink carrier, power for transmitting an uplink signal on an NR SUL carrier to the network device.

Figure 9:
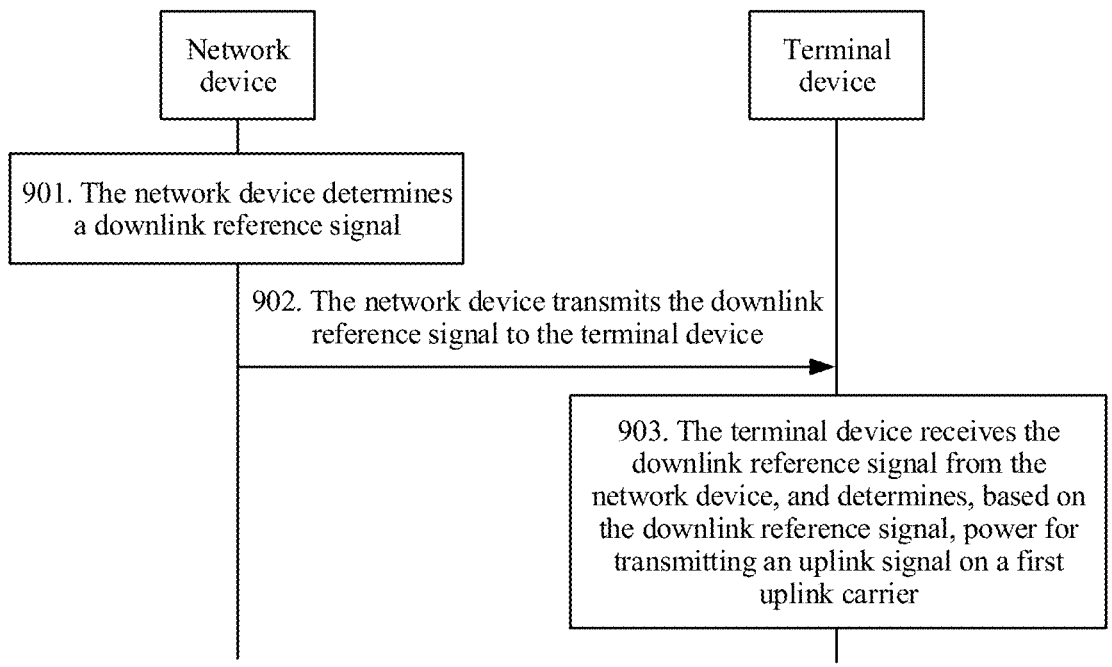
FIG. 9 is a schematic flowchart of a power control method according to this application.

Optionally, this application further provides another method for power control. As shown in FIG. 9, the process of power control includes the following steps:

Step 901: A network device determines a downlink reference signal.

In this application, the downlink reference signal may be used by a terminal device to determine power for transmitting an uplink signal on a first uplink carrier to the network device.

Step 902: The network device transmits the downlink reference signal on a first downlink carrier to a terminal device.

The first downlink carrier and the first uplink carrier may belong to different cells. The first downlink carrier is a downlink carrier in a primary cell, and the first uplink carrier is an uplink carrier in a secondary cell. Alternatively, the first downlink carrier is a downlink carrier of a first radio access technology, and the first uplink carrier is an uplink carrier of a second radio access technology. The first radio access technology is LTE, and the second radio access technology is NR. The first uplink carrier, a second uplink carrier, and a second downlink carrier belong to a same cell.

Optionally, the network device may further transmit indication information to the terminal device, where the indication information may indicate the terminal device to determine, based on the downlink reference signal, the power for transmitting the uplink signal on the first uplink carrier to the network device, or the indication information indicates the terminal device not to determine, by using the downlink reference signal, the power for transmitting the uplink signal on the first uplink carrier to the network device. It should be noted that, the indication information may be transmitted explicitly by the network device to the terminal device. For example, the indication information may include two states, where a first state indicates the terminal device to determine, based on the downlink reference signal, the power for transmitting the uplink signal on the first uplink carrier to the network device, and a second state indicates the terminal device not to determine, by using the downlink reference signal, the power for transmitting the uplink signal on the first uplink carrier to the network device. Certainly, the indication information may alternatively be implicitly carried in other information. For example, the network device transmits information indicating a frequency of the first uplink carrier to the terminal device, where the indication information may be carried in the information indicating the frequency of the first uplink carrier. Specifically, when the network device indicates, to the terminal device, that the frequency of the first uplink carrier is a first frequency, the terminal device is implicitly indicated to determine, based on the downlink reference signal, the power for transmitting the uplink signal on the first uplink carrier to the network device; or when the network device indicates, to the terminal device, that a frequency of the first uplink carrier is a second frequency, the terminal device is implicitly indicated not to determine, based on the downlink reference signal, the power for transmitting the uplink signal on the first uplink carrier to the network device. The first frequency and/or the second frequency may include a plurality of frequency values.

Optionally, the network device may further transmit second indication information to the terminal device, where the second indication information is used by the terminal device to determine the downlink reference signal. The second indication information includes at least one of resource information, sequence information, and power information corresponding to the downlink reference signal.

Step 903: The terminal device receives the downlink reference signal on the first downlink carrier from the network device, and determines, based on the downlink reference signal, power for transmitting an uplink signal on a first uplink carrier to the network device.

The terminal device receives the downlink reference signal on the first downlink carrier, where the first downlink carrier may be an LTE downlink carrier. The terminal device determines, based on the downlink reference signal received on the LTE downlink carrier, the power for transmitting the uplink signal on the first uplink carrier to the network device. The first uplink carrier, the second uplink carrier, and the second downlink carrier belong to the same cell. It should be understood that, when the terminal device can access LTE and NR simultaneously, the terminal device may determine that the downlink reference signal is LTE downlink reference signal. When the terminal device can access only NR, the terminal device may alternatively receive the downlink reference signal on the LTE downlink carrier. In this case, the terminal device can only determine that the downlink reference signal is received, and does not need to determine that the downlink reference signal is an LTE downlink reference signal. To be specific, LTE is transparent to the terminal device. In other words, the terminal device does not know existence of LTE.

Figure 10:
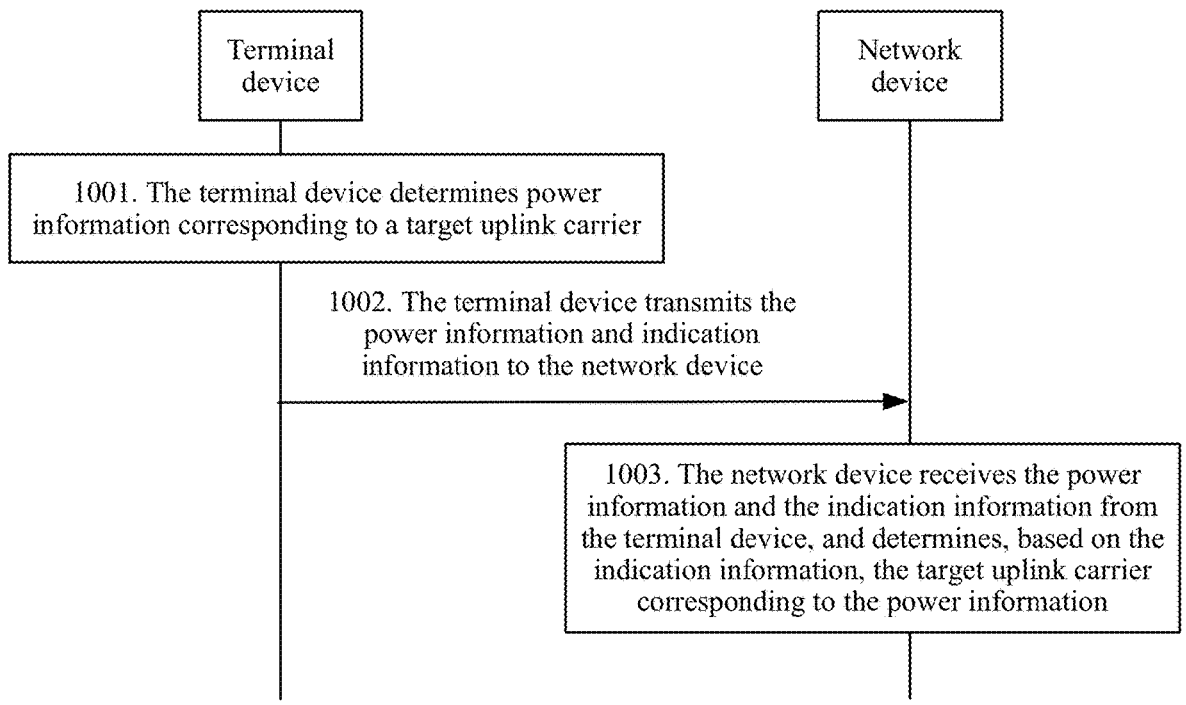
FIG. 10 is a schematic flowchart of a power control method according to this application.

Optionally, this application further provides another method for power control. As shown FIG. 10, the process of power control includes the following steps:

Step 1001: A terminal device determines power information corresponding to a target uplink carrier.

For example, the target uplink carrier may be one of a first uplink carrier or a second uplink carrier. It should be understood that, the terminal device determines at least the power information of the target uplink carrier. The terminal device may determine power information of the other one of the first uplink carrier and the second uplink carrier than the target uplink carrier, or may not determine power information of the other uplink carrier. This is not limited herein.

For another example, the target uplink carrier may include both a first uplink carrier and a second uplink carrier. It should be understood that, the terminal device determines both power information of the first uplink carrier and power information of the second uplink carrier.

For example, the power information may include a difference between first power and second power. The first power may be maximum transmit power of the terminal device, and the maximum transmit power may be nominal/rated maximum transmit power of the terminal device, where the nominal/rated maximum transmit power may also be referred to as nominal maximum transmit power. The first power may alternatively be actual maximum transmit power of the terminal device. A type of the maximum transmit power is not limited herein. The second power may be uplink signal transmit power estimated by the terminal device, where the estimated uplink signal transmit power may be determined by the terminal device according to a predefined rule, or may be determined by the terminal device according to another method. The method for determining the power by the terminal device is not limited herein. Specifically, the estimated uplink signal transmit power may be estimated transmit power of an uplink data/shared channel, or may be estimated transmit power of an uplink control channel, or may be estimated transmit power of an uplink measurement signal, or may be estimated transmit power of an uplink data/shared channel and an uplink control channel, or certainly may be estimated transmit power of another uplink signal.

For another example, the power information may further include maximum transmit power of the terminal device. The maximum transmit power may be nominal/rated maximum transmit power of the terminal device, where the nominal/rated maximum transmit power may also be referred to as nominal maximum transmit power. The first power may alternatively be actual maximum transmit power of the terminal device. A type of the maximum transmit power is not limited herein.

Step 1002: The terminal device transmits the power information and indication information to a network device.

The indication information indicates the uplink carrier corresponding to the power information.

For example, when the target uplink carrier is one of the first uplink carrier or the second uplink carrier, the target uplink carrier is an uplink carrier, the power information corresponds to only the target uplink carrier, and the indication information indicates the target uplink carrier.

Optionally, the indication information may be explicit information. For example, the indication information includes one bit; and when the bit is in a state 0, the indication information indicates that the target uplink carrier is the first uplink carrier, or when the bit is in a state 1, the indication information indicates that the target uplink carrier is the second uplink carrier. It should be understood that, the indication information and the power information are carried in a same message and transmitted by the terminal device to the network device.

Optionally, the indication information may alternatively be implicit information. For example, when the target uplink carrier is the first uplink carrier, the terminal device transmits, on the first uplink carrier to the network device, a message carrying the power information; or when the target uplink carrier is the second uplink carrier, the terminal device transmits, on the second uplink carrier to the network device a message carrying the power information. It should be understood that, the indication information is implicitly carried in the uplink carrier that carries the message carrying the power information and transmitted by the terminal device to the network device.

For another example, if the target uplink carrier includes the first uplink carrier and the second uplink carrier, that is, if the target uplink carrier includes two uplink carriers, the power information includes first power information corresponding to the first uplink carrier and second power information corresponding to the second uplink carrier. The first power information and the second power information may be carried in a same message and transmitted by the terminal device to the network device, or may be carried in different messages and transmitted by the terminal device to the network device.

Optionally, the indication information may be explicit information. For example, the indication information includes two bits, where one of the two bits indicates the first power information, and the other bit indicates the second power information. Specifically, when the one bit is 0, the indication information does not include the first power information; or when the one bit is 1, the indication information includes the first power information. A quantity of bits in the indication information and a correspondence between a state and a meaning of a bit are not limited to the foregoing example.

Optionally, the indication information may be implicit information. For example, the indication information is carried in positions or a sequence in which the first power information and the second power information are carried in the message carrying the power information. For example, the first power information is carried in a first field in the message, the second power information is carried in a second field in the message, the first field corresponds to the first uplink carrier corresponding to the first power information, and the second field corresponds to the second uplink carrier corresponding to the second power information. For another example, the first power information is carried in a first field in the message, the second power information is carried in a second field in the message, and a number of the first field in the message is less than a number of the second field in the message. It should be understood that, the first field having the smaller number corresponds to the first uplink carrier corresponding to the first power information, and the second field having the larger number corresponds to the second uplink carrier corresponding to the second power information. It should be noted that, the foregoing descriptions are all examples of specific implementations, and do not limit the method.

Step 1003: The network device receives the power information and the indication information from the terminal device, and determines, based on the indication information, the target uplink carrier corresponding to the power information.

The network device may receive the power information and the indication information from the terminal device. The network device determines, based on the indication information, the target uplink carrier corresponding to the power information.

When the target uplink carrier is one of the first uplink carrier or the second uplink carrier, the power information received by the network device may be power of the first uplink carrier or the second uplink carrier. The indication information received by the network device may be explicit information. For example, the indication information includes one bit; and when the bit is in the state 0, the indication information indicates that the target uplink carrier is the first uplink carrier, and the network device may determine, based on the indication information, the first uplink carrier corresponding to the first power information of the first uplink carrier. When the bit is in the state 1, the indication information indicates that the target uplink carrier is the second uplink carrier, and the network device may determine, based on the indication information, the second uplink carrier corresponding to the second power information of the second uplink carrier.

For another example, when the indication information is implicit information, and the target uplink carrier is the first uplink carrier, the network device receives, on the first uplink carrier, the message carrying the power information and transmitted by the terminal device, so that the network device may determine that the power information is the power information of the first uplink carrier, that is, determine that the first uplink carrier is the target uplink carrier. Correspondingly, if the network device receives, on the second uplink carrier, the message carrying the power information and transmitted by the terminal device, the network device may determine that the received power information is the power information of the second uplink carrier, that is, determine that the second uplink carrier is the target uplink carrier.

Alternatively, the target uplink carrier may include the first uplink carrier and the second uplink carrier, that is, the target uplink carrier includes two uplink carriers, and the power information includes the first power information corresponding to the first uplink carrier and the second power information corresponding to the second uplink carrier.

Optionally, when the indication information is explicit information, for example, when the indication information is two bits, one of the two bits indicates the first power information, and the other bit indicates the second power information. When the one bit is 0, the indication information does not include the first power information; or when the one bit is 1, the indication information includes the first power information. For example, when the indication information received by the network device is or, it indicates that the received power information is the second power information and does not include the first power information. Therefore, the network device may determine the second uplink carrier corresponding to the second power information. To be specific, the second uplink carrier is the target uplink carrier. For another example, when the indication information received by the network device is 10, it indicates that the received power information is the first power information and does not include the second power information. Therefore, the network device may determine the first uplink carrier corresponding to the first power information. To be specific, the first uplink carrier is the target uplink carrier. For another example, when the indication information received by the network device is 11, it indicates that the received power information is the first power information and the second power information. Therefore, the network device may determine the first uplink carrier corresponding to the first power information and the second uplink carrier corresponding to the second power information. To be specific, the first uplink carrier and the second uplink carrier are target uplink carriers.

Optionally, when the indication information is implicit information, for example, when the indication information is carried in the positions or the sequence in which the first power information and the second power information are carried in the message carrying the power information, for example, when the first power information is carried in the first field in the message, and the second power information is carried in the second field in the message, the first field corresponds to the first uplink carrier corresponding to the first power information, and the second field corresponds to the second uplink carrier corresponding to the second power information. For example, if the network device receives the power information in the first field in the received message, the network device may determine that the power information is the first power information of the first uplink carrier, so as to determine the first uplink carrier corresponding to the first power information. To be specific, the first uplink carrier is the target uplink carrier. For another example, if the network device receives the power information in the second field in the received message, the network device may determine that the power information is the second power information of the second uplink carrier, so as to determine the second uplink carrier corresponding to the second power information. To be specific, the second uplink carrier is the target uplink carrier.

For another example, the first power information is carried in the first field in the message, the second power information is carried in the second field in the message, and the number of the first field in the message is less than the number of the second field in the message. In this case, when the network device receives the power information in the first field having the smaller number in the message, it indicates that the power information is the first power information of the first uplink carrier, and in this case, the network device may determine the first uplink carrier corresponding to the first power information. To be specific, the first uplink carrier is the target uplink carrier. It should be noted that, the foregoing descriptions are all examples of specific implementations, and do not limit the method.

Figure 11:
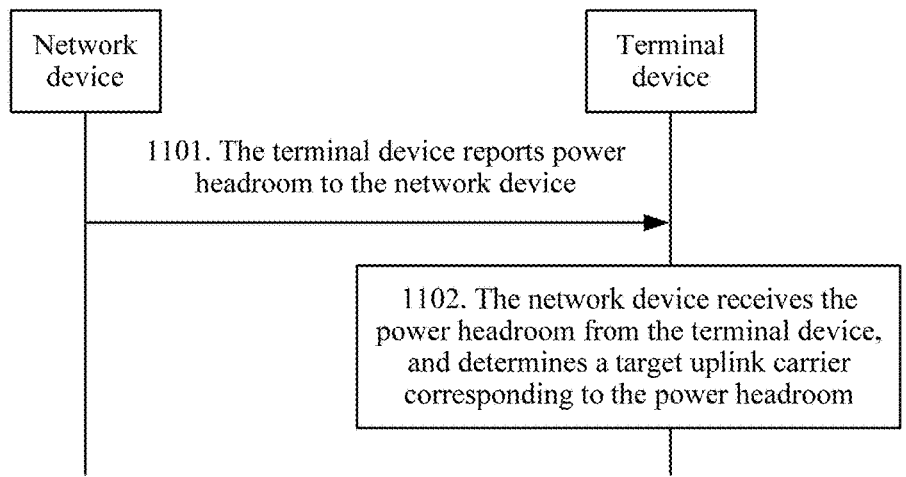
FIG. 11 is a schematic flowchart of a power control method according to this application.

Optionally, a process of power control is shown in FIG. 11, and the process specifically includes the following steps:

Step 1101: A terminal device reports power headroom to a network device.

The power headroom is a difference between maximum transmit power of the terminal device and power determined by the terminal device for transmitting an uplink signal, where the maximum transmit power may be nominal maximum transmit power, or may be actual maximum transmit power. The power determined by the terminal device for transmitting the uplink signal may be an accurate value of the power determined by the terminal device, or may be a value estimated by the terminal device.

The power headroom may be a difference between the maximum transmit power of the terminal device and transmit power of a data signal or data channel estimated by the terminal device, or may be a difference between the maximum transmit power of the terminal device and transmit power of a measurement signal estimated by the terminal device, or may be a difference between the maximum transmit power of the terminal device and transmit power of a control signal or control channel estimated by the terminal device, or may be a difference between the maximum transmit power of the terminal device and transmit power of a data signal or data channel and a control signal or control channel estimated by the terminal device.

Considering that the terminal device may transmit an uplink signal on a first uplink carrier or may transmit an uplink signal on a second uplink carrier, and that maximum transmit power of the terminal device on the first uplink carrier may be different from maximum transmit power of the terminal device on the second uplink carrier, determined power, for transmitting the uplink signal, of the terminal device on the first uplink carrier may be different from determined power, for transmitting the uplink signal, of the terminal device on the second uplink carrier either. Therefore, for the terminal device, a value of power headroom corresponding to the first uplink carrier may be different from a value of power headroom corresponding to the second uplink carrier. Therefore, the terminal device needs to report the power headroom of the first uplink carrier and the power headroom of the second uplink carrier separately.

A target uplink carrier may be one of the first uplink carrier or the second uplink carrier. The terminal device determines at least power headroom of the target uplink carrier. The terminal device may alternatively determine power headroom of the other one of the first uplink carrier and the second uplink carrier than the target uplink carrier, or may not determine power headroom of the other uplink carrier. This is not limited herein.

Alternatively, the target uplink carrier may include both the first uplink carrier and the second uplink carrier. To be specific, the terminal device determines not only the power headroom of the first uplink carrier but also the power headroom of the second uplink carrier.

Step 1102: The network device receives the power headroom from the terminal device, and determines a target uplink carrier corresponding to the power headroom.

When the terminal device reports the power headroom to the network device, the terminal device needs to add, to a message carrying the power headroom, indication information used to indicate the uplink carrier corresponding to the power headroom, where the indication information indicates one of the first uplink carrier or the second uplink carrier. In this case, the network device may determine, based on the indication information, whether the uplink carrier corresponding to the received power headroom is the first uplink carrier or the second uplink carrier. Otherwise, the network device cannot determine the uplink carrier corresponding to the power headroom.

The indication information may be explicit information. For example, the indication information includes one bit; and when the bit is in a state 0, the indication information indicates that the target uplink carrier is the first uplink carrier, or when the bit is in a state 0, the indication information indicates that the target uplink carrier is the second uplink carrier. It should be understood that, the indication information and the power headroom may be carried in a same message and transmitted by the terminal device to the network device.

Optionally, the indication information may alternatively be implicit information. For example, when the target uplink carrier is the first uplink carrier, the terminal device transmits, to the network device on the first uplink carrier, the message carrying the power headroom; or when the target uplink carrier is the second uplink carrier, the terminal device transmits, to the network device on the second uplink carrier, the message carrying the power headroom. It should be understood that, the indication information is implicitly carried in the uplink carrier that carries the message carrying the power headroom and transmitted by the terminal device to the network device.

For another example, if the target uplink carrier includes the first uplink carrier and the second uplink carrier, that is, if the target uplink carrier includes two uplink carriers, the power headroom includes the power headroom of the first uplink carrier and the power headroom of the second uplink carrier. The power headroom of the first uplink carrier and the power headroom of the second uplink carrier may be carried in a same message and transmitted by the terminal device to the network device, or may be carried in different messages and transmitted by the terminal device to the network device.

Optionally, the indication information may be explicit information. For example, the indication information includes two bits, where one of the two bits indicates the power headroom of the first uplink carrier, and the other bit indicates the power headroom of the second uplink carrier. Specifically, when the one bit is 0, the indication information does not include the power headroom of the first uplink carrier; or when the one bit is 1, the indication information includes the power headroom of the first uplink carrier. A quantity of bits in the indication information and a correspondence between a state and a meaning of a bit are not limited to the foregoing example.

Optionally, the indication information may be implicit information. For example, the indication information is carried in positions or a sequence in which the power headroom of the first uplink carrier and the power headroom of the second uplink carrier are carried in the message carrying the power headroom. For example, the power headroom of the first uplink carrier is carried in a first field in the message, the power headroom of the second uplink carrier is carried in a second field in the message, the first field corresponds to the first uplink carrier corresponding to the power headroom of the first uplink carrier, and the second field corresponds to the second uplink carrier corresponding to the power headroom of the second uplink carrier. For another example, the power headroom of the first uplink carrier is carried in a first field in the message, the power headroom of the second uplink carrier is carried in a second field in the message, and a number of the first field in the message is less than a number of the second field in the message. It should be understood that, the first field having the smaller number corresponds to the first uplink carrier corresponding to the power headroom of the first uplink carrier, and the second field having the larger number corresponds to the second uplink carrier corresponding to the power headroom of the second uplink carrier. It should be noted that, the foregoing descriptions are all examples of specific implementations, and do not limit the method.

When the target uplink carrier is one of the first uplink carrier or the second uplink carrier, the power headroom received by the network device may be the power headroom of the first uplink carrier or the second uplink carrier. The indication information received by the network device may be explicit information. For example, the indication information includes one bit; and when the bit is in the state 0, the indication information indicates that the target uplink carrier is the first uplink carrier, and the network device may determine, based on the indication information, the first uplink carrier corresponding to the power headroom of the first uplink carrier. When the bit is in the state 1, the indication information indicates that the target uplink carrier is the second uplink carrier, and the network device may determine, based on the indication information, the second uplink carrier corresponding to the power headroom of the second uplink carrier.

For another example, when the indication information is implicit information, and the target uplink carrier is the first uplink carrier, the network device receives, on the first uplink carrier, the message carrying the power headroom and transmitted by the terminal device. In this case, the network device may determine that the power headroom is the power headroom of the first uplink carrier, that is, determine that the first uplink carrier is the target uplink carrier. Correspondingly, if the network device receives, on the second uplink carrier, the message carrying the power headroom and transmitted by the terminal device, the network device may determine that the received power headroom is the power headroom of the second uplink carrier, that is, determine that the second uplink carrier is the target uplink carrier.

Alternatively, the target uplink carrier may include the first uplink carrier and the second uplink carrier, that is, the target uplink carrier includes two uplink carriers, and the power headroom includes the power headroom corresponding to the first uplink carrier and the power headroom corresponding to the second uplink carrier.

Optionally, when the indication information is explicit information, for example, when the indication information is two bits, one of the two bits indicates the power headroom of the first uplink carrier, and the other bit indicates the power headroom of the second uplink carrier. When the one bit is 0, the indication information does not include the power headroom of the first uplink carrier; or when the one bit is 1, the indication information includes the power headroom of the first uplink carrier. For example, when the indication information received by the network device is or, it indicates that the received power headroom is the power headroom of the second uplink carrier and does not include the power headroom of the first uplink carrier. In this case, the network device may determine the second uplink carrier corresponding to the power headroom of the second uplink carrier. To be specific, the second uplink carrier is the target uplink carrier. For another example, when the indication information received by the network device is 10, it indicates that the received power headroom is the power headroom of the first uplink carrier and does not include the power headroom of the second uplink carrier. In this case, the network device may determine the first uplink carrier corresponding to the power headroom of the first uplink carrier. To be specific, the first uplink carrier is the target uplink carrier. For another example, when the indication information received by the network device is 11, it indicates that the received power headroom is the power headroom of the first uplink carrier and the power headroom of the second uplink carrier. In this case, the network device may determine the first uplink carrier corresponding to the power headroom of the first uplink carrier and the second uplink carrier corresponding to the power headroom of the second uplink carrier. To be specific, the first uplink carrier and the second uplink carrier are target uplink carriers.

Optionally, when the indication information is implicit information, for example, when the indication information is carried in the positions or the sequence in which the power headroom of the first uplink carrier and the power headroom of the second uplink carrier are carried in the message carrying the power headroom, for example, when the power headroom of the first uplink carrier is carried in the first field in the message, and the power headroom of the second uplink carrier is carried in the second field in the message, the first field corresponds to the first uplink carrier corresponding to the power headroom of the first uplink carrier, and the second field corresponds to the second uplink carrier corresponding to the power headroom of the second uplink carrier. For example, if the network device receives the power headroom in the first field in the received message, the network device may determine that the power headroom is the power headroom of the first uplink carrier, so as to determine the first uplink carrier corresponding to the power headroom of the first uplink carrier. To be specific, the first uplink carrier is the target uplink carrier. For another example, if the network device receives the power headroom in the second field in the received message, the network device may determine that the power headroom is the power headroom of the second uplink carrier, so as to determine the second uplink carrier corresponding to the power headroom of the second uplink carrier. To be specific, the second uplink carrier is the target uplink carrier.

For another example, the power headroom of the first uplink carrier is carried in the first field in the message, the power headroom of the second uplink carrier is carried in the second field in the message, and the number of the first field in the message is less than the number of the second field in the message. In this case, when the network device receives the power headroom in the first field having the smaller number in the message, it indicates that the power headroom is the power headroom of the first uplink carrier, and the network device may determine the first uplink carrier corresponding to the power headroom of the first uplink carrier. To be specific, the first uplink carrier is the target uplink carrier. It should be noted that, the foregoing descriptions are all examples of specific implementations, and do not limit the method.

Figure 12:
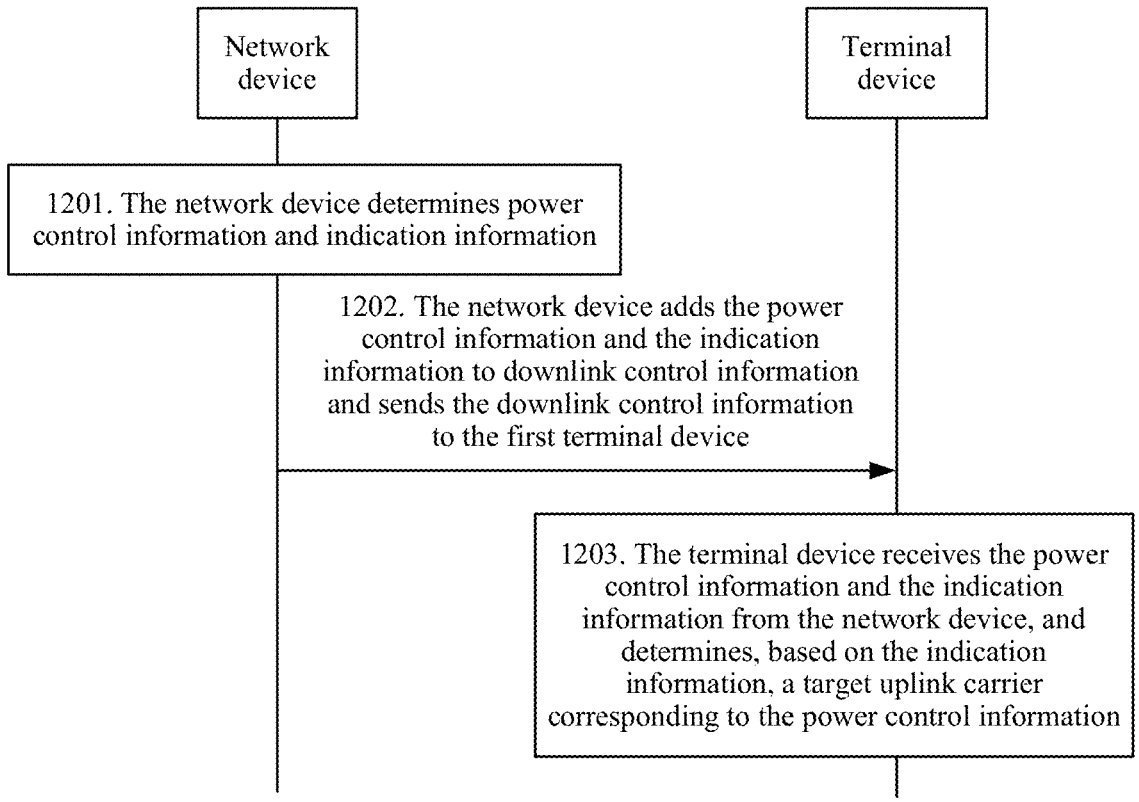
FIG. 12 is a schematic flowchart of a power control method according to this application.

Optionally, this application further provides another process of power control. As in FIG. 12, the process includes the following steps:

Step 1201: A network device determines power control information and indication information, where the power control information is used by a first terminal device to determine power for transmitting an uplink signal on a target uplink carrier to the network device, and the indication information indicates the target uplink carrier corresponding to the power control information.

Optionally, if the target uplink carrier includes one of a first uplink carrier or a second uplink carrier, the power control information is used by the first terminal device to determine power for transmitting an uplink signal on one of the first uplink carrier or the second uplink carrier to the network device, and the indication information indicates one of the first uplink carrier or the second uplink carrier corresponding to the power control information.

Optionally, if the target uplink carrier includes a first uplink carrier and a second uplink carrier, the power control information includes first power control information used to indicate the first terminal device to determine power for transmitting an uplink signal on the first uplink carrier to the network device, and also includes second power control information used to indicate the first terminal device to determine power for transmitting an uplink signal on the second uplink carrier to the network device, and the indication information includes first indication information used to indicate the first uplink carrier corresponding to the first power control information, and second indication information used to indicate the second uplink carrier corresponding to the second power control information.

Step 1202: The network device transmits the power control information and the indication information to the first terminal device.

Optionally, when the target uplink carrier includes one of the first uplink carrier or the second uplink carrier, the network device may add the power control information and the indication information to a same piece of downlink control information (downlink control information, DCI).

For example, the power control information is included in a first field in the DCI, and the indication information is included in a second field in the DCI. For example, the first field may be two bits or may be one bit, and the second field may be one bit. Specifically, the second field may be understood as a carrier indicator field, referred to as SC_UL_Index, or certainly may have another name, and this is not limited herein. When the second field is 0, it indicates a TDD carrier (NR UL); or when the second field is 1, it indicates a SUL carrier. It should be noted that, a correspondence between a value of the second field and an indicated carrier may be predefined in a protocol. To be specific, when it is predetermined in the protocol that: when the carrier indicator field is 0, it indicates the TDD carrier (NR UL); or when the carrier indicator field is 1, it indicates the SUL carrier. Certainly, the correspondence may alternatively be configured. In addition, an implementation of the second field is not limited to that in this application, and may also be applicable to another case in which at least one of two carriers needs to be indicated, especially in an NR system in which a SUL carrier is configured, that is, a scenario in which one TDD carrier and one SUL carrier are configured for NR. For example, DCI used for uplink scheduling may also include the second field, and the DCI used for uplink scheduling may be back-off DCI, or may be DCI dedicated for the terminal device, or certainly may be another type of DCI.

For another example, the power control information and the indication information are both included in a third field in the DCI. It should be understood that, the power control information and the indication information are included in the third field in a joint coding mode, and the third field may be three bits or may be two bits. The DCI may further include a plurality of 3-bit third fields, for example, a field 1, a field 2, a field 3, .... Each field includes power control information and indication information corresponding to one terminal device.

The DCI may further include power control information and/or indication information corresponding to a second terminal device, in addition to the power control information and the indication information corresponding to the first terminal device, and the second terminal device may be a plurality of second terminal devices. For example, the DCI may include power control information and indication information of any second terminal device. It should be understood that, the DCI may include only a first-type field. To be specific, each field includes both power control information and indication information. For another example, the DCI may include two types of fields, where a first-type field is a field including power control information and indication information, and a second-type field is a field including only power control information. In this case, bit lengths of the first-type field and the second-type field may be the same or may be different. For example, the first-type field includes three bits, and the second-type field also includes three bits, but in the second-type field, only two bits are used for power control information, and the remaining one bit is a reserved bit or a padding bit. Alternatively, the first-type field includes three bits, where the three bits include power control information and indication information, and the second-type field includes two bits, where the two bits include only power control information.

For another example, the DCI includes a plurality of pieces of power control information, and each piece of power control information corresponds to one terminal device. In addition, the DCI further includes a piece of indication information, where the indication information indicates target uplink carriers corresponding to the plurality of pieces of power control information. In this case, for a plurality of terminal devices receiving the DCI, target uplink carriers determined by the terminal devices based on the piece of indication information are same uplink carriers.

For another example, the indication information may be implicitly carried in the DCI. For example, the network device may scramble the DCI by using two different identifiers, where a first identifier in the two different identifiers corresponds to the first uplink carrier, and a second identifier in the two different identifiers corresponds to the second uplink carrier. In this case, the terminal device can determine the target carrier based on a scrambling identifier of the DCI. Specifically, the identifier may be a radio network temporary identifier (radio network temporary identity, RNTI), or may be another identifier, and this is not limited herein.

Optionally, when the target uplink carrier includes one of the first uplink carrier or the second uplink carrier, the network device may add the power control information to the DCI and transmit the DCI to the terminal device, and add the indication information to other signaling and transmit the other signaling to the terminal device. The other signaling may be higher layer signaling, for example, radio resource control RRC layer signaling.

For example, the network device adds the power control information to a first bit and a second bit in the DCI. In this case, the network device not only transmits the DCI to the terminal device, but also transmits the indication information to the terminal device, where the indication information indicates, to the terminal device, a bit position in which the power control information corresponding to the target carrier is located in the DCI. In this example, the indication information indicates the first bit and the second bit in the DCI. Specifically, the indication information may directly indicate the first bit and the second bit, or the indication information may indicate the first bit. In addition, the network device and the terminal device both learn in advance that the power control information is carried in two consecutive bits in the DCI.

For example, the first bit in the DCI corresponds to the power control information of the first uplink carrier, and the second bit in the DCI corresponds to the power control information of the second uplink carrier. When the indication information indicates the first bit in the DCI, the network device adds the power control information of the first uplink carrier to the first bit in the DCI, and the terminal device may determine, based on the indication information, that the target uplink carrier corresponding to the power control information carried in the first bit is the first uplink carrier.

Optionally, when the target uplink carrier includes the first uplink carrier and the second uplink carrier, the network device adds the first power control information and the second power control information to a same piece of DCI and transmits the DCI to the terminal device. The network device adds the first indication information and the second indication information to other signaling and transmits the other signaling to the terminal device. The other signaling may be higher layer signaling, for example, radio resource control RRC layer signaling.

For example, the network device adds the first power control information to the first bit and the second bit in the DCI, and adds the second power control information to a third bit and a fourth bit in the DCI. In this case, the network device not only transmits the DCI to the terminal device, but also transmits the first indication information and the second indication information to the terminal device, where the first indication information and the second indication information respectively indicate, to the terminal device, bit positions in which the first power control information corresponding to the first uplink carrier and the second power control information corresponding to the second uplink carrier are located in the DCI. In this example, the first indication information indicates the first bit and the second bit in the DCI. Specifically, the indication information may directly indicate the first bit and the second bit, or the indication information may indicate the first bit. In addition, the network device and the terminal device learn in advance that the power control information is carried in two consecutive bits in the DCI. The second indication information indicates the third bit and the fourth bit in the DCI. A specific indication manner is similar to that of the first indication information, and is not described again herein. It should be noted that, the bit positions and bit lengths of the first power control information and/or the second power control information in the DCI are not limited to this example, and may alternatively be another value.

For example, when the indication information indicates the first bit and the second bit, the power control information added by the network device to the DCI is the first power control information of the first uplink carrier, and the terminal device may determine, based on the indication information, that the target uplink carrier corresponding to the first power control information is the first uplink carrier. For another example, when the indication information indicates the third bit and the fourth bit, the power control information added by the network device to the DCI is the second power control information of the second uplink carrier, and the terminal device may determine, based on the indication information, that the target uplink carrier corresponding to the second power control information is the second uplink carrier.

In the foregoing embodiment, downlink control information (downlink control information, DCI) transmitted by the network device to the first terminal device may be DCI transmitted for a plurality of terminal devices, that is, group common (group common) DCI, or certainly may be DCI dedicated for the first terminal device.

It should be noted that, the field herein is used only for describing one or more bits in the DCI, and does not limit names of some bits in the DCI. For example, the DCI includes 30 bits in total. The 30 bits may be understood as one field, or certainly one or more of the 30 bits may be understood as one field. This is not limited herein. It should also be noted that, the DCI may also include some reserved bits or padding bits.

Step 1203: The terminal device receives the power control information and the indication information from the network device. The terminal device may determine, based on the indication information, the target uplink carrier corresponding to the power control information.

The indication information is used to indicate the terminal device to determine a power parameter. For example, the indication information indicates the terminal device to adjust the power parameter. For example, if the indication information indicates −1 dB, where dB denotes decibel, the terminal device determines that a value of the power parameter is reduced by 1 dB on a basis of a previous value. For another example, the indication information indicates the terminal device to determine the power parameter. For example, if the indication information indicates 4 dB, the terminal device determines that a value of the power parameter is 4 dB.

Optionally, when the target uplink carrier includes one of the first uplink carrier or the second uplink carrier, the terminal device receives the power control information and the indication information in the DCI. The indication information may be implicitly carried in the DCI. For example, the DCI may be scrambled by using two different identifiers, where a first identifier corresponds to the first uplink carrier, and a second identifier corresponds to the second uplink carrier. For example, when the terminal device obtains the first identifier in the received DCI, the terminal device may determine that the received power control information is the power control information of the first uplink carrier, and in this case, the terminal device may determine the first uplink carrier corresponding to the received power control information of the first uplink carrier. To be specific, the first uplink carrier is the target uplink carrier. For another example, when the terminal device obtains the second identifier in the received DCI, the terminal device may determine that the received power control information is the power control information of the second uplink carrier, and in this case, the terminal device may determine the second uplink carrier corresponding to the received power control information of the second uplink carrier. To be specific, the second uplink carrier is the target uplink carrier.

Optionally, the indication information may alternatively be carried in other signaling and transmitted to the terminal device, where the other signaling may be higher layer signaling, for example, radio resource control RRC layer signaling. The indication information may indicate, to the terminal device, the bit position in which the power control information corresponding to the target carrier is located in the DCI. In this case, when the indication information received by the terminal device in the higher layer signaling is the first bit in the DCI, the terminal device may determine that the power control information carried in the DCI is the power control information of the first uplink carrier, and in this case, the terminal device may determine the first uplink carrier corresponding to the received power control information of the first uplink carrier. To be specific, the first uplink carrier is the target uplink carrier. For another example, when the indication information received by the terminal device in the higher layer signaling is the second bit in the DCI, the terminal device may determine that the power control information carried in the DCI is the power control information of the second uplink carrier, and in this case, the terminal device may determine the second uplink carrier corresponding to the received power control information of the second uplink carrier. To be specific, the second uplink carrier is the target uplink carrier.

Optionally, the target uplink carrier may alternatively include both the first uplink carrier and the second uplink carrier. The first power control information of the first uplink carrier and the second power control information of the second uplink carrier may be carried in a same piece of DCI. For example, the first power control information is carried in a first bit and a second bit in the DCI, and the second power control information is carried in a third bit and a fourth bit in the DCI. The indication information may be carried in higher layer signaling. The indication information includes the first indication information corresponding to the first uplink carrier and the second indication information corresponding to the second uplink carrier. The first indication information and the second indication information respectively indicate, to the terminal device, bit positions in which the first power control information corresponding to the first uplink carrier and the second power control information corresponding to the second uplink carrier are located in the DCI.

For example, when the indication information received by the terminal device is the first bit, the terminal device may determine that the power control information carried in the DCI is the first power control information, and in this case, the terminal device may determine the first uplink carrier corresponding to the received first power control information. To be specific, the first uplink carrier is the target uplink carrier. For another example, when the indication information received by the terminal device in the higher layer signaling is the second bit in the DCI, the terminal device may determine that the power control information carried in the DCI is the first power control information, and in this case, the terminal device may determine the first uplink carrier corresponding to the received first power control information. To be specific, the first uplink carrier is the target uplink carrier. For another example, when the indication information received by the terminal device in the higher layer signaling is the third bit in the DCI, the terminal device may determine that the power control information carried in the DCI is the second power control information, and in this case, the terminal device may determine the second uplink carrier corresponding to the received second power control information. To be specific, the second uplink carrier is the target uplink carrier.

It should be noted that, the bit positions and bit quantities of the first power control information and/or the second power control information in the DCI are not limited to this example, and may alternatively be another value.

Figure 13:
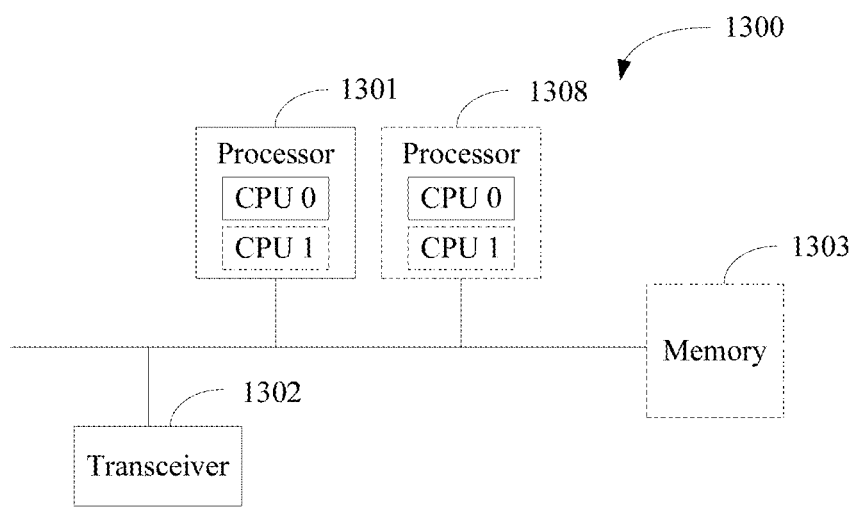
FIG. 13 is a schematic structural diagram of an apparatus for transmitting information according to this application.

Based on a same inventive concept, FIG. 13 is a schematic diagram of an apparatus according to this application. The apparatus may be a terminal device, and may perform the method performed by the terminal device in any one of the foregoing embodiments.

The terminal device 1300 includes at least one processor 1301 and a transceiver 1302, and optionally further includes a memory 1303. The processor 1301, the transceiver 1302, and the memory 1303 are interconnected.

The processor 1301 may be a general purpose central processing unit, a microprocessor, an application-specific integrated circuit, or one or more integrated circuits for controlling program execution in the embodiment of this application.

The transceiver 1302 is configured to communicate with another device or a communications network. The transceiver includes a radio frequency circuit.

The memory 1303 may be a read-only memory or another type of static storage device capable of storing static information and instructions, or a random access memory or another type of dynamic storage device capable of storing information and instructions, or may be an electrically erasable programmable read-only memory, a compact disc read-only memory or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and can be accessed by a computer. However, no limitation is set thereto. The memory 1303 may exist independently, and is connected to the processor 1301. The memory 1303 may alternatively be integrated with the processor. The memory 1303 is configured to store application program code used to execute the embodiment of this application, where the application program code is executed under control of the processor 1301. The processor 1301 is configured to execute the application program code stored in the memory 1303.

In a specific implementation, in an embodiment, the processor 1301 may include one or more CPUs, for example, a CPU 0 and a CPU 1 in FIG. 13.

In a specific implementation, in an embodiment, the terminal device 1300 may include a plurality of processors, for example, the processor 1301 and a processor 1308 in FIG. 13. Each of the processors may be a single-core (single-CPU) processor, or may be a multi-core (multi-CPU) processor. The processor herein may be one or more devices, circuits, and/or processing cores configured to process data (for example, a computer program instruction).

It should be understood that, the terminal device may be configured to implement the step performed by the terminal device in the method for transmitting and receiving information according to this application. For related features, refer to the foregoing descriptions. Details are not described again herein.

Figure 14:
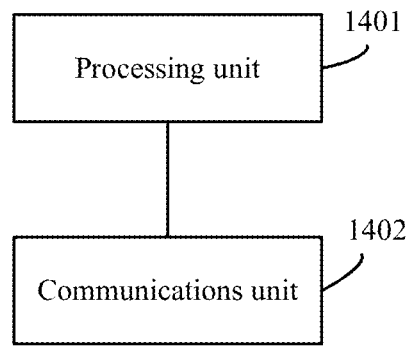
FIG. 14 is a schematic structural diagram of an apparatus for transmitting information according to this application.

In this application, function modules may be defined for the terminal device based on the foregoing method example. For example, each function module may be defined in a correspondence to each function. Alternatively, two or more functions may be integrated into one processing module. The integrated module may be implemented in a form of hardware, or may be implemented in a form of a software functional module. It should be noted that, in this application, module division is an example, and is merely logical function division. In actual implementation, another division manner may be used. For example, when each function module is defined in a correspondence to each function, FIG. 14 is a schematic diagram of an apparatus. The apparatus may be the terminal device in the foregoing embodiment. The apparatus includes a processing unit 1401 and a communications unit 1402.

The communications unit 1402 is configured to receive indication information from a network device, where the indication information indicates a timing adjustment parameter, the timing adjustment parameter is to be used to determine transmit timings on a first uplink carrier and a second uplink carrier, the first uplink carrier is an uplink carrier of a first radio access technology, and the second uplink carrier is an uplink carrier of a second radio access technology.

The processing unit 1401 is configured to determine the timing adjustment parameter based on the indication information received by the communications unit 1402.

Optionally, the second uplink carrier includes at least two second uplink carriers, and the at least two second uplink carriers belong to a same cell; and the timing adjustment parameter is to be used by the processing unit 1401 to determine transmit timings on the first uplink carrier and the at least two second uplink carriers.

Optionally, the at least two second uplink carriers include at least one TDD carrier and at least one SUL carrier.

Optionally, the first uplink carrier is a carrier in a primary cell, and the second uplink carrier is a carrier in a secondary cell; and when receiving the indication information from the network device, the communications unit 1402 is specifically configured to: receive the indication information on a first downlink carrier from the network device, where the first downlink carrier and the first uplink carrier belong to a same cell, or the first downlink carrier and the first uplink carrier belong to a same radio access technology.

Optionally, the first radio access technology is LTE, and the second radio access technology is NR.

Optionally, the first uplink carrier is an uplink carrier in the primary cell, and the second uplink carrier is an uplink carrier in the secondary cell; and the processing unit 1401 is further configured to: control the communications unit 1402 to receive a downlink reference signal on a first downlink carrier from the network device, where the first downlink carrier and the first uplink carrier belong to a same cell; and determine, based on the downlink reference signal received by the communications unit 1402, power for transmitting an uplink signal on the second uplink carrier to the network device.

Optionally, the processing unit 1401 is further configured to: control the communications unit 1402 to receive a downlink reference signal on a first downlink carrier from the network device, where the first downlink carrier is a downlink carrier of the first radio access technology, and the first downlink carrier and the first uplink carrier belong to a same cell; and determine, based on the downlink reference signal received by the communications unit 1402, power for transmitting an uplink signal on the second uplink carrier to the network device.

Optionally, the processing unit 1401 is further configured to: control the communications unit 1402 to receive a downlink reference signal on a first downlink carrier from the network device, where the first downlink carrier is a downlink carrier of the first radio access technology, and the first downlink carrier and the first uplink carrier belong to different cells; and determine, based on the downlink reference signal received by the communications unit 1402, power for transmitting an uplink signal on the second uplink carrier to the network device.

It should be understood that, the terminal device may be configured to implement the step performed by the terminal device in the method for transmitting and receiving information according to this application. For related features, refer to the foregoing descriptions. Details are not described again herein.

Figure 15:
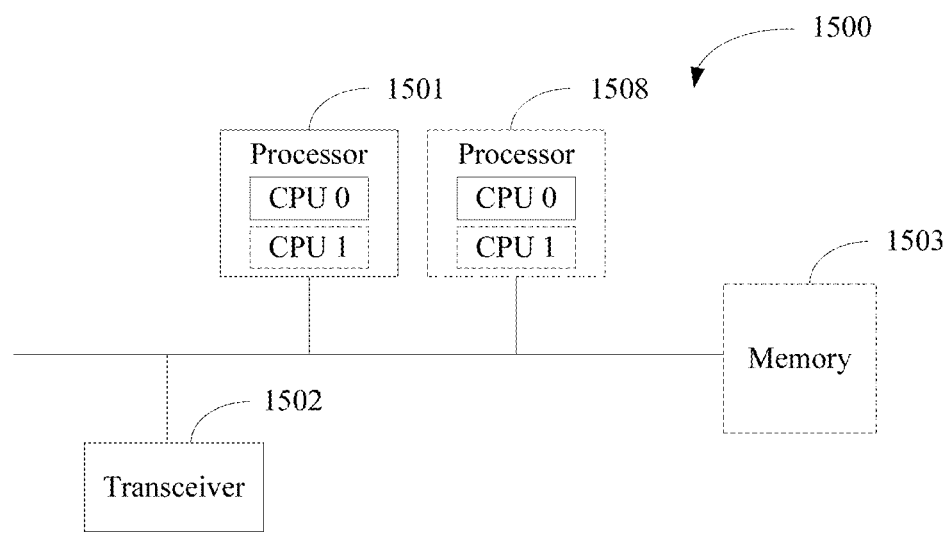
FIG. 15 is a schematic structural diagram of an apparatus for receiving information according to this application.

Based on a same inventive concept, FIG. 15 is a schematic diagram of an apparatus according to an embodiment of this application. The apparatus may be a network device, and may perform the method performed by the network device in any one of the foregoing embodiments.

The network device 1500 includes at least one processor 1501 and a transceiver 1502, and optionally further includes a memory 1503. The processor 1501, the transceiver 1502, and the memory 1503 are interconnected.

The processor 1501 may be a general purpose central processing unit (CPU), a microprocessor, an application-specific integrated circuit (application-specific integrated circuit, ASIC), or one or more integrated circuits for controlling program execution in the embodiment of this application.

The transceiver 1502 is configured to communicate with another device or a communications network. The transceiver includes a radio frequency circuit.

The memory 1503 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and can be accessed by a computer. However, no limitation is set thereto. The memory 1503 may exist independently, and is connected to the processor 1501. The memory 1503 may alternatively be integrated with the processor. The memory 1503 is configured to store application program code used to execute the embodiment of this application, where the application program code is executed under control of the processor 1501. The processor 1501 is configured to execute the application program code stored in the memory 1503.

In a specific implementation, in an embodiment, the processor 1501 may include one or more CPUs, for example, a CPU 0 and a CPU 1 in FIG. 15.

In a specific implementation, in an embodiment, the network device 1500 may include a plurality of processors, for example, the processor 1501 and a processor 1508 in FIG. 15. Each of the processors may be a single-core (single-CPU) processor, or may be a multi-core (multi-CPU) processor. The processor herein may be one or more devices, circuits, and/or processing cores configured to process data (for example, a computer program instruction).

It should be understood that, the network device may be configured to implement the step performed by the network device in the method for transmitting and receiving information according to this application. For related features, refer to the foregoing descriptions. Details are not described again herein.

Figure 16:
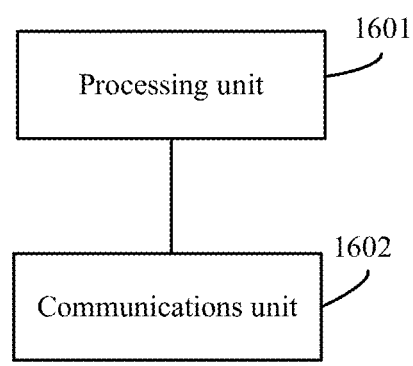
FIG. 16 is a schematic structural diagram of an apparatus for receiving information according to this application.

In this application, function modules may be defined for the network device based on the foregoing method example. For example, each function module may be defined in a correspondence to each function. Alternatively, two or more functions may be integrated into one processing module. The integrated module may be implemented in a form of hardware, or may be implemented in a form of a software functional module. It should be noted that, in this application, module division is an example, and is merely logical function division. In actual implementation, another division manner may be used. For example, when each function module is defined in a correspondence to each function, FIG. 16 is a schematic diagram of an apparatus. The apparatus may be the network device in the foregoing embodiment. The apparatus includes a processing unit 1601 and a communications unit 1602.

The processing unit 1601 is configured to determine indication information, where the indication information indicates a timing adjustment parameter, the timing adjustment parameter is to be used by a terminal device to determine transmit timings on a first uplink carrier and a second uplink carrier, the first uplink carrier is an uplink carrier of a first radio access technology, and the second uplink carrier is an uplink carrier of a second radio access technology.

The communications unit 1602 is configured to transmit the indication information determined by the processing unit 1601 to the terminal device.

Optionally, the second uplink carrier includes at least two second uplink carriers, and the at least two second uplink carriers belong to a same cell; and the timing adjustment parameter is to be used by the terminal device to determine transmit timings on the first uplink carrier and the at least two second uplink carriers.

Optionally, the at least two second uplink carriers include at least one TDD carrier and at least one SUL carrier.

Optionally, the first uplink carrier is a carrier in a primary cell, and the second uplink carrier is a carrier in a secondary cell; and when transmitting the indication information to the terminal device, the communications unit 1602 is specifically configured to: transmit the indication information on a first downlink carrier to the terminal device, where the first downlink carrier and the first uplink carrier belong to a same cell, or the first downlink carrier and the first uplink carrier belong to a same radio access technology.

Optionally, the first radio access technology is LTE, and the second radio access technology is NR.

Optionally, the first uplink carrier is an uplink carrier in the primary cell, and the second uplink carrier is an uplink carrier in the secondary cell; and the processing unit 1601 is further configured to: control the communications unit 1602 to transmit a downlink reference signal on a first downlink carrier to the terminal device, where the first downlink carrier and the first uplink carrier belong to a same cell.

Optionally, the processing unit 1601 is further configured to: control the communications unit 1602 to transmit a downlink reference signal on a first downlink carrier to the terminal device, where the first downlink carrier is a downlink carrier of the first radio access technology, and the first downlink carrier and the first uplink carrier belong to a same cell.

Optionally, the processing unit 1601 is further configured to: control the communications unit 1602 to transmit a downlink reference signal on a first downlink carrier to the terminal device, where the first downlink carrier is a downlink carrier of the first radio access technology, and the first downlink carrier and the first uplink carrier belong to different cells.

It should be understood that, the network device may be configured to implement the step performed by the network device in the method for transmitting and receiving information according to the embodiment of this application. For related features, refer to the foregoing descriptions. Details are not described again herein.

An embodiment of this application further provides a computer storage medium, configured to store a computer software instruction used by the network device or the terminal device. The computer software instruction includes program code designed for performing the foregoing method embodiment.

A person skilled in the art should understand that this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk storage, a CD-ROM, an optical storage, or the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. Therefore, this application is intended to cover these modifications and variations of this application provided that they fall within the scope of protection defined by the following claims of this application and their equivalent technologies.

What is claimed is:

1. A method, comprising:
    transmitting, by a terminal device, a random access preamble to a network device using a first uplink carrier of a plurality of uplink carriers in a timing adjustment group, wherein the random access preamble is transmitted using a first $N_{TAoffset}$ timing offset between a first time allocated for transmitting a random access signal on the first uplink carrier and a third time allocated for receiving a downlink signal on a first downlink carrier from the network device;
    after transmitting the random access preamble, receiving, by a terminal device, indication information transmitted by a network device, wherein the indication information comprises a timing adjustment parameter, the timing adjustment parameter corresponds to the plurality of uplink carriers in the timing adjustment group, the plurality of uplink carriers in the time adjustment group are of a same cell, and when the terminal device sends an uplink signal on any uplink carrier of the plurality of uplink carriers, the terminal device uses the timing adjustment parameter to determine a transmit timing of the uplink signal; and sending, by the terminal device, an uplink signal on at least one carrier of the plurality of uplink carriers in the timing adjustment group based on the indication information; and wherein the plurality of uplink carriers of the timing adjustment group includes the first uplink carrier and a second uplink carrier, and the first $N_{TAoffset}$ timing offset between the first time allocated for transmitting the random access signal on the first uplink carrier and the third time allocated for receiving a downlink signal on the first downlink carrier from the network device is equal to a second $N_{TAoffset}$ timing offset between a second time allocated for transmitting a random access signal on the second uplink carrier and the third time allocated for receiving the downlink signal on the first downlink carrier from the network device, and wherein a value of the first $N_{TAoffset}$ timing offset or the second $N_{TAoffset}$ timing offset is a fixed value predefined in a protocol.

2. The method according to claim 1, wherein subcarrier spacings corresponding to the uplink carriers of the plurality of uplink carriers in the timing adjustment group have different values, and a timing adjustment granularity corresponding to the timing adjustment parameter is a timing adjustment granularity corresponding to an uplink carrier having a largest subcarrier spacing in the plurality of uplink carriers.

3. The method according to claim 1, wherein the first uplink carrier is a time division duplex (TDD) carrier, and the second uplink carrier is a supplementary uplink (SUL) carrier.

4. A method, comprising:
receiving, by a network device, a random access preamble sent by a terminal device using a first uplink carrier of a plurality of uplink carriers in a timing adjustment group, wherein the random access preamble is transmitted using a first $N_{TAoffset}$ timing offset between a first time allocated for transmitting a random access signal by the terminal device on the first uplink carrier and a third time allocated for transmitting a downlink signal by the network device on a first downlink carrier;

after receiving the random access preamble, determining, by the network device, indication information, wherein the indication information comprises a timing adjustment parameter, the timing adjustment parameter is determined by the network device for the terminal device to use to determine transmit timings of uplink carriers of the plurality of uplink carriers in the timing adjustment group, and the plurality of uplink carriers in the time adjustment group are of a same cell;

transmitting, by the network device, the indication information to the terminal device; and sending, by the terminal device, an uplink signal on at least one carrier of the plurality of uplink carriers in the timing adjustment group based on the indication information; and wherein the plurality of uplink carriers of the timing adjustment group includes the first uplink carrier and a second uplink carrier, and the first $N_{TAoffset}$ timing offset between the first time allocated for the terminal device to transmit a random access signal on the first uplink carrier and the third time allocated for the network device to send a downlink signal on the first downlink carrier is equal to a second $N_{TAoffset}$ timing offset between a second time allocated for the terminal device to transmit a random access signal on the second uplink carrier and the third time allocated for the network device to send the downlink signal on the first downlink carrier, and wherein a value of the first $N_{TAoffset}$ timing offset or the second $N_{TAoffset}$ timing offset is a fixed value predefined in a protocol.

5. The method according to claim 4, wherein subcarrier spacings corresponding to the plurality of uplink carriers in the timing adjustment group have different values, and a timing adjustment granularity corresponding to the timing adjustment parameter is a timing adjustment granularity corresponding to an uplink carrier having a largest subcarrier spacing in the plurality of uplink carriers.

6. The method according to claim 4, wherein the first uplink carrier is a time division duplex (TDD) carrier, and the second uplink carrier is a supplementary uplink (SUL) carrier.

7. An apparatus, comprising:
a transceiver, configured to:
transmit a random access preamble to a network device using a first uplink carrier of a plurality of uplink carriers in a timing adjustment group, wherein the random access preamble is transmitted using a first $N_{TAoffset}$ timing offset between a first time allocated for transmitting a random access signal on the first uplink carrier and a third time allocated for receiving a downlink signal on a first downlink carrier from the network device; and after transmitting the random access preamble, receive indication information transmitted by the network device, wherein the indication information comprises a timing adjustment parameter, the timing adjustment parameter corresponds to the plurality of uplink carriers in the timing adjustment group, and the plurality of uplink carriers in the time adjustment group are of a same cell, and when the apparatus sends an uplink signal on any uplink carrier of the plurality of uplink carriers, the apparatus uses the timing adjustment parameter to determine a transmit timing of the uplink signal; and a processor, configured to determine the timing adjustment parameter based on the indication information; and wherein the plurality of uplink carriers of the timing adjustment group includes the first uplink carrier and a second uplink carrier, and the first $N_{TAoffset}$ timing offset between the first time allocated for transmitting a random access signal on the first uplink carrier and the third time allocated for receiving a downlink signal on the first downlink carrier from the network device is equal to a second $N_{TAoffset}$ timing offset between a second time allocated for transmitting a random access signal on the second uplink carrier and the third time allocated for receiving the downlink signal on the first downlink carrier from the network device, and wherein a value of the first $N_{TAoffset}$ timing offset or the second $N_{TAoffset}$ timing offset is a fixed value predefined in a protocol.

8. The apparatus according to claim 7, wherein subcarrier spacings corresponding to the plurality of uplink carriers in the timing adjustment group have different values, and a timing adjustment granularity corresponding to the timing adjustment parameter is a timing adjustment granularity corresponding to an uplink carrier having a largest subcarrier spacing in the plurality of uplink carriers.

9. The apparatus according to claim 7, wherein the first uplink carrier is a time division duplex (TDD) carrier, and the second uplink carrier is a supplementary uplink (SUL) carrier.

10. A system, comprising:
a network device, comprising:
a first processor, configured to:
receive a random access preamble sent by a terminal device using a first uplink carrier of a plurality of uplink carriers in a timing adjustment group, wherein the random access preamble is transmitted using a first $N_{TAoffset}$ timing offset between a first time allocated for transmitting a random access signal by the terminal device on the first uplink carrier and a third time allocated for transmitting a downlink signal by the network device on a first downlink carrier; and
after receiving the random access preamble, determine indication information, wherein the indication information comprises a timing adjustment parameter, the timing adjustment parameter is determined by the network device for the terminal device to use to determine transmit timings of uplink carriers of the plurality of uplink carriers in the timing adjustment group, and the plurality of uplink carriers in the time adjustment group are of a same cell; and
a first transceiver, configured to transmit the indication information to the terminal device; and
the terminal device, comprising:
a second transceiver, configured to send an uplink signal on at least one carrier of the plurality of uplink carriers in the timing adjustment group based on the indication information; and
wherein the plurality of uplink carriers of the timing adjustment group includes the first uplink carrier and a second uplink carrier, and the first $N_{TAoffset}$ timing offset between the first time allocated for the terminal device to transmit a random access signal on the first uplink carrier and the third time allocated for the network device to send a downlink signal on the first downlink carrier is equal to a second $N_{TAoffset}$ timing offset between a second time allocated for the terminal device to transmit a random access signal on the second uplink carrier and the third time allocated for the network device to send the downlink signal on the first downlink carrier, and wherein a value of the first $N_{TAoffset}$ timing offset or the second $N_{TAoffset}$ timing offset is a fixed value predefined in a protocol.

11. The network device according to claim 10, wherein subcarrier spacings corresponding to the plurality of uplink carriers in the timing adjustment group have different values, and a timing adjustment granularity corresponding to the timing adjustment parameter is a timing adjustment granularity corresponding to an uplink carrier having a largest subcarrier spacing in the plurality of uplink carriers.

12. The network device according to claim 10, wherein the first uplink carrier is a time division duplex (TDD) carrier, and the second uplink carrier is a supplementary uplink (SUL) carrier.

13. A non-transitory computer-readable medium having processor-executable instructions stored thereon, the processor-executable instructions including instructions for:
transmitting a random access preamble to a network device using a first uplink carrier of a plurality of uplink carriers in a timing adjustment group, wherein the random access preamble is transmitted using a first $N_{TAoffset}$ timing offset between a first time allocated for transmitting a random access signal on the first uplink carrier and a third time allocated for receiving a downlink signal on a first downlink carrier from the network device;
after transmitting the random access preamble, receiving indication information transmitted by a network device, wherein the indication information comprises a timing adjustment parameter, the timing adjustment parameter corresponds to a plurality of uplink carriers in a timing adjustment group, and the plurality of uplink carriers in the time adjustment group are of a same cell, and when a terminal sends an uplink signal on any uplink carrier of the plurality of uplink carriers, the terminal uses the timing adjustment parameter to determine a transmit timing of the uplink signal; and
sending an uplink signal on at least one carrier of the plurality of uplink carriers in the timing adjustment group based on the indication information; and
wherein the plurality of uplink carriers of the timing adjustment group includes the first uplink carrier and a second uplink carrier, and the first $N_{TAoffset}$ timing offset between the first time allocated for the terminal to transmit a random access signal on the first uplink carrier and the third time allocated for transmitting a downlink signal on the first downlink carrier is equal to a second $N_{TAoffset}$ timing offset between a second time allocated for the terminal to transmit a random access signal on the second uplink carrier and the third time allocated for transmitting the downlink signal on the first downlink carrier, and wherein a value of the first $N_{TAoffset}$ timing offset or the second $N_{TAoffset}$ timing offset is a fixed value predefined in a protocol.

14. The non-transitory computer-readable medium according to claim 13, wherein subcarrier spacings corresponding to the plurality of uplink carriers in the timing adjustment group have different values, and a timing adjustment granularity corresponding to the timing adjustment parameter is a timing adjustment granularity corresponding to a uplink carrier having a largest subcarrier spacing in the plurality of uplink carriers.

* * * * *